(12) United States Patent
Zhang

(10) Patent No.: US 12,127,165 B2
(45) Date of Patent: Oct. 22, 2024

(54) TRANSMISSION RESOURCE DETERMINING METHOD AND APPARATUS

(71) Applicant: Huawei Technologies Co., Ltd., Shenzhen (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 506 days.

(21) Appl. No.: 17/338,165

(22) Filed: Jun. 3, 2021

(65) Prior Publication Data

US 2021/0297994 A1 Sep. 23, 2021

Related U.S. Application Data

(63) Continuation of application No. PCT/CN2019/112662, filed on Oct. 23, 2019.

(30) Foreign Application Priority Data

Dec. 4, 2018 (CN) .......................... 201811476078.5

(51) Int. Cl.
*H04W 72/02* (2009.01)
*H04L 1/18* (2023.01)
(Continued)

(52) U.S. Cl.
CPC .......... *H04W 72/02* (2013.01); *H04L 1/1819* (2013.01); *H04L 1/1896* (2013.01);
(Continued)

(58) Field of Classification Search
CPC . H04W 72/02; H04W 72/0453; H04W 72/20; H04W 72/53; H04W 76/11;
(Continued)

(56) References Cited

U.S. PATENT DOCUMENTS

| 10,306,592 B2 | 5/2019 | Yu et al. |
| 10,383,123 B2 | 8/2019 | Wu et al. |

(Continued)

FOREIGN PATENT DOCUMENTS

| CN | 104396325 A | 3/2015 |
| CN | 105794294 A | 7/2016 |

(Continued)

OTHER PUBLICATIONS

LG Electronics et al.,"Discussion on physical layer procedure for NR V2X", 3GPP TSG RAN WG1 Meeting #95, R1-1812842, Nov. 12-16, 2018, 6 pages, Spokane, USA.

(Continued)

*Primary Examiner* — Candal Elpenord
(74) *Attorney, Agent, or Firm* — Slater Matsil, LLP

(57) ABSTRACT

With development of communications technologies, an internet-of-vehicles technology for vehicle-to-everything (V2X) communication is proposed. In this application, a third device receives first information and/or sidelink control information. The first information includes indication information of a first resource set, the first resource set is for receiving data, the sidelink control information includes indication information of a second resource set, and the second resource set is for sending data. The third device determines an available resource in the first resource set, and/or determines an available resource in the second resource set. The method can resolve a hidden node problem and an exposed node problem on a sidelink.

16 Claims, 4 Drawing Sheets

(51) Int. Cl.

| | |
|---|---|
| *H04L 1/1812* | (2023.01) |
| *H04L 1/1867* | (2023.01) |
| *H04W 72/04* | (2023.01) |
| *H04W 72/0453* | (2023.01) |
| *H04W 72/20* | (2023.01) |
| *H04W 76/11* | (2018.01) |
| *H04W 92/18* | (2009.01) |

(52) U.S. Cl.
CPC ....... *H04W 72/0453* (2013.01); *H04W 72/20* (2023.01); *H04W 76/11* (2018.02); *H04W 92/18* (2013.01)

(58) Field of Classification Search
CPC .... H04W 76/14; H04W 92/18; H04L 1/1819; H04L 1/1896; H04L 1/1854; H04L 1/1887; H04L 5/0037; H04L 5/0053
USPC .................................................. 370/329–330
See application file for complete search history.

(56) References Cited

U.S. PATENT DOCUMENTS

| | | | |
|---|---|---|---|
| 10,849,155 | B2 | 11/2020 | Gao et al. |
| 2017/0013655 | A1 | 1/2017 | Martin et al. |
| 2017/0150527 | A1 | 5/2017 | Duval et al. |
| 2017/0195993 | A1 | 7/2017 | Cole et al. |
| 2017/0347394 | A1* | 11/2017 | Yasukawa ............. H04W 28/04 |
| 2019/0052411 | A1* | 2/2019 | Chae ................... H04W 52/242 |
| 2020/0412485 | A1* | 12/2020 | Wang .................... H04L 1/0081 |
| 2021/0029675 | A1* | 1/2021 | Ji .......................... H04L 1/1819 |
| 2021/0306824 | A1* | 9/2021 | Li ............................ H04W 4/40 |
| 2021/0377912 | A1* | 12/2021 | El Hamss ............. H04L 1/1854 |
| 2023/0337260 | A1* | 10/2023 | Li ........................ H04L 1/1854 |

FOREIGN PATENT DOCUMENTS

| | | |
|---|---|---|
| CN | 106550318 A | 3/2017 |
| CN | 106612561 A | 5/2017 |
| CN | 107027181 A | 8/2017 |
| CN | 108322414 A | 7/2018 |
| CN | 108924892 A | 11/2018 |
| EP | 3553985 A1 | 10/2019 |
| EP | 3554033 A1 | 10/2019 |
| WO | 2018064179 A1 | 4/2018 |
| WO | 2018133720 A1 | 7/2018 |
| WO | 2018137452 A1 | 8/2018 |
| WO | 2019029652 A1 | 2/2019 |

OTHER PUBLICATIONS

ITL et al., "Discussion on NR V2X HARQ mechanism", 3GPP TSG RAN WG1 Meeting #95, R1-1813976, Nov. 12-6, 2018, 4 pages, Spokane, USA.

IEEE Std 802.11-2016, IEEE Standard for Information technology-Telecommunications and information exchange between systems Local and metropolitan area networks—Specific requirements, "Part 11: Wireless LAN Medium Access Control (MAC) and Physical Layer (PHY) Specifications", Approved Dec. 7, 2016, 3534 pages, New York, USA.

3GPP TS 38.211 V15.3.0 (Sep. 2018), 3rd Generation Partnership Project, Technical Specification Group Radio Access Network, NR, Physical channels and modulation (Release 15), 2018, 96 pages.

NTT Docomo, Inc., "Sidelink resource allocation mechanism", 3GPP TSG RAN WG1 Meeting #94bis, R1-1811335, Oct. 8-12, 2018, 10 pages, Chengdu, China.

3GPP TS 38.212 V15.3.0 (Sep. 2018), 3rd Generation Partnership Project, Technical Specification Group Radio Access Network, NR, Multiplexing and channel coding (Release 15), 99 pages.

Intel Corporation, "Summary of offline discussion on NR-V2X AI—7.2.4.1.4 Resource Allocation Mechanism", 3GPP TSG RAN WG1 Meeting #94bis, R1-1811963, Oct. 8-12, 2018, 8 pages, Chengdu, China.

3GPP TS 38.213 V15.3.0 (Sep. 2018), 3rd Generation Partnership Project, Technical Specification Group Radio Access Network, NR, Physical layer procedures for control (Release 15), 101 pages.

3GPP TS 38.214 V15.3.0 (Sep. 2018), 3rd Generation Partnership Project, Technical Specification Group Radio Access Network, NR, Physical layer procedures for data (Release 15), 96 pages.

3GPP TS 38.321 V15.3.0 (Sep. 2018), 3rd Generation Partnership Project, Technical Specification Group Radio Access Network, NR, Medium Access Control (MAC) protocol specification (Release 15), 76 pages.

Huawei et al., "Support for sidelink unicast, groupcast and broadcast", 3GPP TSG RAN WG1 Meeting #94bis, R1-1810137, Oct. 8-12, 2018, 9 pages, Chengdu, China.

CMCC., "Discussion on HARQ feedback and CSI acquisition for sidelink", 3GPP TSG RAN WG1 Meeting #95, R1-1812879, Nov. 12-16, 2018, 5 pages, Spokane, USA.

Huawei et al., "Design and contents of PSCCH and PSFCH", 3GPP TSG RAN WG1 Meeting #95, R1-1813554, Nov. 12-16, 2018, 7 pages, Spokane, USA.

* cited by examiner

TRANSMISSION RESOURCE DETERMINING METHOD AND APPARATUS

CROSS-REFERENCE TO RELATED APPLICATIONS

This application is a continuation of International Application No. PCT/CN2019/112662, filed on Oct. 23, 2019, which claims priority to Chinese Patent Application No. 201811476078.5, filed on Dec. 4, 2018. The disclosures of the aforementioned applications are hereby incorporated by reference in their entireties.

TECHNICAL FIELD

This application relates to the field of wireless communications, and more specifically, to a transmission resource determining method and apparatus.

BACKGROUND

With development of wireless communications technologies, people have increasing requirements for a high data rate and user experience, and have increasing requirements for a proximity service for knowing people or things around and communicating with them. Therefore, a device-to-device (D2D) technology emerges. In view of characteristics and advantages of the D2D technology, an internet-of-vehicles application scenario based on the D2D technology is proposed.

Currently, in a long term evolution (LTE) technology proposed in the 3rd generation partnership project (3GPP), an internet-of-vehicles technology for vehicle-to-everything (V2X) communication is proposed. In addition, with development of a future 5th generation (5G) system or a new radio (NR) technology in the 3GPP standards organization, a 5G NR V2X communication technology will also be further developed.

Vehicles communicate with each other in a V2X communications system, which provides vehicle-to-vehicle (Vehicle to Vehicle, V2V), vehicle-to-pedestrian (Vehicle to Pedestrian, V2P), vehicle-to-infrastructure (Vehicle to Infrastructure, V2I), and vehicle-to-network (Vehicle to Network, V2N) intelligent transportation services. Uplinks and downlinks are used for the V2N vehicles communicate with the network, and sidelinks are used for the V2V/V2I/V2P data communication. The sidelink (SL) is defined for direct communication between communications devices, that is, the communications devices directly communicate with each other without forwarding performed by a base station.

A V2X service may be usually sent by a terminal to another terminal by using a sidelink resource on a sidelink. The sidelink resource may be allocated to the terminal by a base station to which the terminal belongs, or may be determined by the terminal. When a V2X terminal in 5G NR determines a resource to perform sidelink (SL) transmission, the terminal device usually determines an available transmission resource through sensing. When determining the resource through sensing, the terminal device usually performs determining for a sensed resource according to a specific rule. For example, the terminal device determines whether signal strength of a received signal on the sensed resource meets a specific signal strength requirement, and if determining that the received signal on the sensed resource meets the signal strength requirement, determines that the sensed resource can be used.

Therefore, a method is required to resolve a problem of low sensing efficiency on an SL.

SUMMARY

This application provides a transmission resource determining method, to improve sensing efficiency on a sidelink, and more properly make use of a sidelink resource.

According to a first aspect, a transmission resource determining method is provided. The method may be performed by a terminal device, or may be performed by a chip disposed in a terminal device. This is not limited in this application. It should be noted that the terminal device herein corresponds to a first device below.

Specifically, the method includes: determining first information, where the first information includes indication information of a first resource set and a first indication field, and the first indication field is used to indicate that the first resource set is for receiving data; and sending the first information.

According to a second aspect, a transmission resource determining method is provided. The method may be performed by a terminal device, or may be performed by a chip disposed in a terminal device. This is not limited in this application. It should be noted that the terminal device herein corresponds to a second device below.

Specifically, the method includes: determining sidelink control information, where the sidelink control information includes indication information of a second resource set and a second indication field, and the second indication field is used to indicate that the second resource set is for sending data; and sending the sidelink control information.

For a terminal device (for example, a third device) on an SL, the terminal device may be within coverage of the second device, and may not be within coverage of the first device; or the terminal device may be within coverage of the first device, and may not be within coverage of the second device; or the terminal device may be within coverage of both the first device and the second device. It should be noted that the first device, the second device, and the third device in this application are used merely for ease of description, and are not intended to limit a specific device. A terminal device or another type of device that supports sidelink communication may have functions, of all of the first device, the second device, and the third device, described in this application, or have a function of at least one of the first device, the second device, and the third device. For example, the terminal device or the another type of device can send sidelink control information to another terminal device, and/or can send first information to another terminal device, and/or can determine an available resource by detecting sidelink control information and/or first information that are/is sent by another terminal device.

Optionally, in a possible communications system, the terminal device does not support the first information, and another terminal device in the coverage of the second device may detect the sidelink control information sent by the second device, and determine the available resource in the second resource set, to avoid a resource conflict and improve sensing efficiency.

Based on the foregoing technical solution, the second device sends the sidelink control information, and the first device sends the first information, so that a terminal device that is in the coverage of the second device and not in the coverage of the first device can determine, based on the second indication field carried in the sidelink control information sent by the second device, that the second resource set is for sending data by the second device. In this case, the terminal device may further determine whether a resource in the second resource set can be used, to avoid using an originally unavailable resource in the second resource set, improve the sensing efficiency, and avoid a resource conflict caused by a hidden node problem.

The second device sends the sidelink control information, and the first device sends the first information, so that a terminal device that is in the coverage of the first device and not in the coverage of the second device can determine, based on a first indication field carried in the first information sent by the first device, that a first resource set is for receiving data by the first device. In this case, the terminal device may further determine whether a resource in the first resource set can be used, to avoid using an originally unavailable resource in the first resource set, improve the sensing efficiency, and avoid a resource conflict caused by a hidden node problem.

The second device sends the sidelink control information, and the first device sends the first information, so that a terminal device that is in the coverage of both the first device and the second device can determine, when receiving the first information and the sidelink control information, whether a resource in a union set of the first resource set and the second resource set can be used. The terminal device may further determine whether a resource in an intersection set of the first resource set and the second resource set can be used, to avoid using an originally unavailable resource, improve the sensing efficiency, and avoid a resource conflict caused by a hidden node problem.

The second device sends the sidelink control information, and the first device sends the first information, so that a terminal device that is in the coverage of both the first device and the second device can determine, based on the first information and the sidelink control information, a resource (for example, a resource in the first resource set) actually occupied during data transmission between the second device and the first device. The terminal device may further determine whether the resource actually occupied during the data transmission between the second device and the first device can be used. The terminal device may choose to use a resource, in the second resource set, that is not occupied during the data transmission between the second device and the first device, so that the terminal device is prevented from remaining silent or being free from access on all resources in the second resource set indicated by the second device, thereby improving the sensing efficiency, and avoiding low resource utilization caused by an exposed node problem.

In addition, the first indication field is used to indicate that the resource in the first resource set is to be used, to receive data, by the terminal device that sends the first information; and the second indication field is used to indicate that the resource in the second resource set is to be used, to send data, by the terminal device that sends the sidelink control information. In this way, a terminal device that receives information can determine, based on the first indication field or the second indication field, that the received information is from a terminal device that is about to sending data or a terminal device configured to receive data, so that the terminal device that receives the information can determine, according to different rules for different sources of the received information, whether the resource indicated by the received information can be used.

In a possible implementation, the first indication field is a format field in the first information, and a value of the format field in the first information is different from a value of a format field in the sidelink control information.

Based on the foregoing technical solution, the value of the format field in the first information is used to indicate that the first information is from the terminal device configured to receive data, and the value of the format field in the sidelink control information is set to be different from the value of the format field in the first information, to indicate the different sources of the information to the terminal device that receives the information.

In a possible implementation, before the sending the first information, the method further includes: receiving the sidelink control information sent by the second device, where the sidelink control information includes the indication information of the second resource set and the second indication field, the second indication field is used to indicate that the second resource set is for sending data, and the first resource set is a subset of the second resource set.

Based on the foregoing technical solution, the second device sends the sidelink control information. Correspondingly, the first device receives the sidelink control information sent by the second device. In this case, the first device may determine the first information based on the sidelink control information. For example, the first device may determine a subset of the second resource set as the first resource set.

It should be noted that, in this embodiment of this application, the first resource set may be a subset of the second resource set. In this case, there may be two cases: A part of resources in the first resource set are a subset of the second resource set; and all resources in the first resource set are a subset of the second resource set. However, this embodiment of this application is not limited thereto. For example, when determining, after measuring the resources in the second resource set, that all the resources in the second resource set are unavailable, the first device may determine the resources in the first resource set, that is, none of the resources in the first resource set may belong to the second resource set.

In a possible implementation, the sending the first information includes: sending the first information on a resource in a third resource set, where the third resource set is different from a fourth resource set and/or is different from a fifth resource set, the fourth resource set is a resource set for sending sidelink control information, and the fifth resource set is a resource set for sending an acknowledgment/negative acknowledgment ACK/NACK.

In a possible implementation, the sending the first information includes: sending the first information on a resource in a third resource set, where the third resource set is a subset of a fourth resource set or is a subset of a fifth resource set, the fourth resource set is a resource set for sending sidelink control information, and the fifth resource set is a resource set for sending an acknowledgment/negative acknowledgment ACK/NACK.

Based on the foregoing technical solution, a terminal device that sends the information indicates, by using the resource set in which the resource carrying the information is located, that the information received by the terminal device is from the device configured to send data or the device configured to receive data, so that the terminal device that receives the information can determine, based on the resource set in which the resource carrying the information is located, that the received information is from the device configured to send data or the device configured to receive data.

The third resource set, the fourth resource set, and the fifth resource set may be configured by a network device by using signaling. For example, the network device may configure the third resource set for any one of the second device, the first device, and the third device by using at least one of radio resource control (RRC) signaling, media access control (MAC) signaling, and physical layer signaling. Correspondingly, the first device, the second device, or the third device may obtain configuration information sent by the network device, and determine, based on the configuration information, the third resource set configured by the network device for the first device, the second device, or the third device. In other words, the network device may configure, for any terminal device operating on the sidelink, the third resource set by using at least one of radio resource control (RRC) signaling, media access control (MAC) signaling, and physical layer signaling. Correspondingly, the terminal device operating on the sidelink may obtain configuration information sent by the network device, and determine, based on the configuration information, the third resource set configured by the network device for the terminal device operating on the sidelink. Similarly, the network device may configure the fifth resource set for any one of the second device, the first device, and the third device by using at least one of RRC signaling, MAC signaling, or physical layer signaling. Correspondingly, the first device, the second device, or the third device may obtain configuration information sent by the network device, and determine, based on the configuration information, the fifth resource set configured by the network device for the first device, the second device, or the third device. In other words, the network device may configure, for any terminal device operating on the sidelink, the fifth resource set by using at least one of RRC signaling, MAC signaling, and physical layer signaling. Correspondingly, the terminal device operating on the sidelink may obtain configuration information sent by the network device, and determine, based on the configuration information, the fifth resource set configured by the network device for the terminal device operating on the sidelink. The fifth resource set is a resource set, on the sidelink, used for sending an acknowledgment/negative acknowledgment ACK/NACK. The fifth resource set may be different from a resource set, configured for a Uu interface, used for send an acknowledgment/negative acknowledgment ACK/NACK. The Uu interface is an interface for direct communication between the network device and the terminal device.

In a possible implementation, the sidelink control information includes at least one of the following: the resource for sending the first information, a time domain position for sending the first information, and a sequence of sending first information by a plurality of devices in a first communication group. The first communication group is a groupcast communication group to which the first device belongs, and the plurality of devices include the first device.

Based on the foregoing technical solution, the sidelink control information may be used to indicate the resource carrying the first information when the terminal device sends the first information and/or the time domain position for sending the first information when the terminal device sends the first information. When the first device is a device in the groupcast communication group, the sidelink control information may further be used to indicate a sequence of sending first information by a plurality of terminal devices that receive the sidelink control information, so that the plurality of terminal devices that receive the sidelink control information send the first information in the sequence indicated by the sidelink control information.

In a possible implementation, before the sending the first information, the method further includes: receiving the sidelink control information sent by the second device, where the sidelink control information includes second information, and the second information is used to indicate to send the first information; or receiving third information sent by the network device, where the third information is used to indicate to send the first information.

Based on the foregoing technical solution, the first device may be triggered to send the first information. The sidelink control information may be used to indicate the first device to send the first information. In addition, the third information sent by the network device may alternatively be used to indicate the first device to send the first information.

Optionally, the second information may be an indication field, included in the sidelink control information, used to indicate whether to send the first information. In other words, the indication field, included in the sidelink control information, used to indicate whether to send the first information is trigger information, and the first device determines, based on the trigger information, whether to send the first information. For example, when the indication field, included in the sidelink control information, used to indicate whether to send the first information is set to 1, it indicates that a device that receives the sidelink control information needs to send the first information. When the indication field, included in the sidelink control information, used to indicate whether to send the first information is set to 0, it indicates that a device that receives the sidelink control information does not need to send the first information.

Optionally, the third information may be control information sent by the network device, and the control information may include an indication field used to indicate whether to send the first information. In other words, the indication field, included in the control information, used to indicate whether to send the first information is trigger information, and the first device determines, based on the trigger information, whether to send the first information. For example, when the indication field used to indicate whether to send the first information is set to 1, it indicates that a device that receives the sidelink control information or a receiving device performing sidelink communication needs to send the first information. When the indication field used to indicate whether to send the first information is set to 0, it indicates that a device that receives the sidelink control information or a receiving device performing sidelink communication does not need to send the first information.

In a possible implementation, the sidelink control information includes an indication field used to indicate whether to send feedback information, and the feedback information is a feedback from the first device for channel sounding of the resource in the second resource set.

Specifically, the indication field, included in the sidelink control information, used to indicate whether to send the feedback information is trigger information, and the first device may determine, based on the trigger information, whether to send the feedback information. For example, when the indication field used to indicate whether to send the feedback information is set to 1, it indicates that the device that receives the sidelink control information needs to send the feedback information. When the indication field used to indicate whether to send the feedback information is set to 0, it indicates that the device that receives the sidelink control information does not need to send the feedback information.

In a possible implementation, the sidelink control information includes an indication field used to indicate whether determining of whether to send feedback information needs to be performed based on a channel busy ratio (CBR), and the feedback information is a feedback from the first device for channel sounding of the resource in the second resource set.

Specifically, the indication field, included in the sidelink control information, used to indicate whether the determining of whether to send the feedback information needs to be performed based on the CBR is trigger information, and the first device may determine, based on the trigger information, whether the determining of whether to send the feedback information needs to be performed based on the CBR. For example, when the indication field used to indicate whether the determining of whether to send the feedback information needs to be performed based on the CBR is set to 1, it indicates that the device that receives the sidelink control information needs to determine, based on the CBR, whether to send the feedback information. When the indication field used to indicate whether to send the feedback information is set to 0, it indicates that the device that receives the sidelink control information does not need to determine, based on the CBR, whether to send the feedback information.

When the determining of whether to send the feedback information needs to be performed based on the CBR, the CBR may be compared with a preconfigured CBR threshold. When the CBR is greater than or equal to the CBR threshold, the feedback information does not need to be sent. When the CBR is less than the CBR threshold, the feedback information needs to be sent.

Optionally, the feedback information may be one or more of a hybrid automatic repeat request (HARQ), the first information, and channel state information (CSI).

Optionally, the sidelink control information may include a feedback timing of the feedback information. The feedback timing may be a fixed time, or may be a flexible time. The fixed time is preconfigured, and is dynamically activated by the sidelink control information; or the fixed time is specified in the sidelink control information. Preconfigured times may be some fixed moments that are pre-notified by using RRC signaling. There may be one or more fixed moments, and the fixed moment may have a corresponding index value (index), so that a corresponding index can be used to perform an activation operation during activation. When the feedback timing indicated in the sidelink control information is the fixed time, the first device sends, at the determined time, the feedback information on an available resource that is sensed. When the feedback timing indicated in the sidelink control information is the flexible time, the first device sends, at the flexible time, the feedback information on an available resource that is sensed.

Optionally, the sidelink control information may include resource information used to send the feedback information.

Optionally, during groupcast, the sidelink control information may include a sequence of sending feedback information by the plurality of devices in the first communication group. The first communication group is a groupcast communication group to which the second device belongs, and the plurality of devices include the second device.

Optionally, the feedback timing of the feedback information may be configured for the sidelink by the network device. The configuration means sending the feedback timing to the terminal device by using at least one of RRC signaling, MAC signaling, or physical layer signaling.

Optionally, the indication field used to indicate whether to send the feedback information may not be included in the sidelink control information, and may be included in the control information sent by the network device. Similarly, the indication field used to indicate whether to send the feedback information is trigger information, and the second device determines, based on the trigger information, whether to send the feedback information. For example, when the indication field used to indicate whether to send the feedback information is set to 1, it indicates that a device that receives the sidelink control information or a receiving device performing sidelink communication needs to send the feedback information. When the indication field used to indicate whether to send the feedback information is set to 0, it indicates that a device that receives the sidelink control information or a receiving device performing sidelink communication does not need to send the feedback information.

Optionally, the sidelink control information may include a type indication field or a target identifier indication field. The type indication field or the target identifier indication field may be used to indicate a communication type or a service type. The communication type or the service type may be one or more of unicast, groupcast, or broadcast. For example, when the target identifier indication field is different target IDs, it indicates that the communication type or the service type is the unicast, the groupcast, or the broadcast. Optionally, the sidelink control information may include a duration indication field, and the duration indication field is used to indicate a continuous effective time or a continuous effective window of the scheduling.

The data transmission may be controlled based on detection of the feedback information. Correspondingly, the sensing efficiency may also be improved in combination with the detection of the feedback information and a resource indication in the sidelink control information, thereby avoiding the resource conflict caused by the hidden node problem.

Optionally, the indication field used to indicate whether to send the feedback information may be configured by the network device for the sidelink. The configuration information is sent to the terminal device by using at least one of RRC signaling, MAC signaling, or physical layer signaling.

Specifically, the indication field, included in the configuration information sent by the network device, used to indicate whether to send the feedback information is trigger information, and the first device may determine, based on the trigger information, whether to send the feedback information. For example, when the indication field used to indicate whether to send the feedback information is set to 1, it indicates that a device that receives the configuration information needs to send the feedback information. When the indication field used to indicate whether to send the feedback information is set to 0, it indicates that a device that receives the configuration information does not need to send the feedback information. The configuration information sent by the network device may be directly sent to the first device; or may be sent to the second device and forwarded by the second device to the first device.

Generally, in a unicast or groupcast service, sending of the feedback information needs to be triggered. In a broadcast service, sending of the feedback information does not need to be triggered.

According to a third aspect, a transmission resource determining method is provided. The method may be performed by a terminal device, or may be performed by a chip disposed in a terminal device. This is not limited in this application. It should be noted that the terminal device herein corresponds to a third device below.

Specifically, the method includes: receiving first information and/or sidelink control information, where the first information includes indication information of a first resource set, the first resource set is for receiving data, the sidelink control information includes indication information of a second resource set, the second resource set is for sending data, and the first resource set is a subset of the second resource set; and determining an available resource in the first resource set; and/or determining an available resource in the second resource set.

It should be noted that, in this embodiment of this application, the first resource set may be a subset of the second resource set. In this case, there may be two cases: A part of resources in the first resource set are a subset of the second resource set; and all resources in the first resource set are a subset of the second resource set. However, this embodiment of this application is not limited thereto. For example, when determining, after measuring resources in the second resource set, that all the resources in the second resource set are unavailable, a first device may determine the resources in the first resource set, that is, none of the resources in the first resource set may belong to the second resource set.

For a terminal device (for example, the third device) on an SL, the terminal device may be within coverage of a second device, and may not be within coverage of the first device; or the terminal device may be within coverage of the first device, and may not be within coverage of a second device; or the terminal device may be within coverage of both the first device and a second device.

Based on the foregoing technical solution, the second device sends the sidelink control information, and the first device sends the first information, so that a terminal device that is in the coverage of the second device and not in the coverage of the first device can determine, based on a second indication field carried in the sidelink control information sent by the second device, that the second resource set is for sending data by the second device. In this case, the terminal device may further determine whether a resource in the second resource set can be used, to avoid using an originally unavailable resource in the second resource set, improve sensing efficiency, and avoid a resource conflict caused by a hidden node problem.

The second device sends the sidelink control information, and the first device sends the first information, so that a terminal device that is in the coverage of the first device and not in the coverage of the second device can determine, based on a first indication field carried in the first information sent by the first device, that the first resource set is for receiving data by the first device. In this case, the terminal device may further determine whether a resource in the first resource set can be used, to avoid using an originally unavailable resource in the first resource set, improve sensing efficiency, and avoid a resource conflict caused by a hidden node problem.

The second device sends the sidelink control information, and the first device sends the first information, so that a terminal device that is in the coverage of both the first device and the second device can determine, when receiving the first information and the sidelink control information, whether a resource in a union set of the first resource set and the second resource set can be used. The terminal device may further determine whether a resource in an intersection set of the first resource set and the second resource set can be used, to avoid using an originally unavailable resource, improve sensing efficiency, and avoid a resource conflict caused by a hidden node problem.

The second device sends the sidelink control information, and the first device sends the first information, so that a terminal device that is in the coverage of both the first device and the second device can determine, based on the first information and the sidelink control information, a resource (for example, a resource in the first resource set) actually occupied during data transmission between the second device and the first device. The terminal device may further determine whether the resource actually occupied during the data transmission between the second device and the first device can be used. The terminal device may choose to use a resource, in the second resource set, that is not occupied during the data transmission between the second device and the first device, so that the terminal device is prevented from remaining silent or being free from access on all the resources in the second resource set indicated by the second device, thereby improving sensing efficiency, and avoiding low resource utilization caused by an exposed node problem.

In a possible implementation, the determining an available resource in the first resource set includes: determining a resource on which a received signal whose signal strength is less than or equal to a first threshold in the first resource set as the available resource; or when signal strength of the first information is less than or equal to the first threshold, determining a resource in the first resource set as the available resource.

Based on the foregoing technical solution, when received information is transmitted by a device configured to receive data, signal strength of a received signal on a resource in the first resource set is compared with the first threshold, and the resource on which the received signal whose signal strength is less than or equal to the first threshold in the first resource set is determined as the available resource; or the signal strength of the first information is compared with the first threshold, and when the signal strength of the first information is less than or equal to the first threshold, it is considered that all the resources in the first resource set are available resources.

In a possible implementation, the method further includes: determining a resource on which a received signal whose signal strength is greater than or equal to the first threshold in the first resource set as an unavailable resource; or when the signal strength of the first information is greater than or equal to the first threshold, determining the resource in the first resource set as an unavailable resource.

Based on the foregoing technical solution, when the received information is transmitted by the device configured to receive data, the signal strength of the received signal on the resource in the first resource set is compared with the first threshold, and the resource on which the received signal whose signal strength is greater than or equal to the first threshold in the first resource set is determined as the unavailable resource; or the signal strength of the first information is compared with the first threshold, and when the signal strength of the first information is greater than or equal to the first threshold, it is considered that all the resources in the first resource set are unavailable resources.

In a possible implementation, the determining an available resource in the second resource set includes: determining a resource on which a received signal whose signal strength is less than or equal to a second threshold in the second resource set as the available resource; or when signal strength of the sidelink control information is less than or equal to a second threshold, determining a resource in the second resource set as the available resource.

Based on the foregoing technical solution, when received information is transmitted by a device configured to send data, signal strength of a received signal on a resource in the second resource set is compared with the second threshold, and the resource on which the received signal whose signal strength is less than or equal to the second threshold in the second resource set is determined as the available resource; or the signal strength of the sidelink control information is compared with the second threshold, and when the signal strength of the sidelink control information is less than or equal to the second threshold, it is considered that all the resources in the second resource set are available resources.

In a possible implementation, the method further includes: determining a resource on which a received signal whose signal strength is greater than or equal to the second threshold in the second resource set as an unavailable resource; or when the signal strength of the sidelink control information is greater than or equal to the second threshold, determining the resource in the second resource set as an unavailable resource.

Based on the foregoing technical solution, when the received information is transmitted by the device configured to send data, the signal strength of the received signal on the resource in the second resource set is compared with the second threshold, and the resource on which the received signal whose signal strength is greater than or equal to the second threshold in the second resource set is determined as the unavailable resource; or the signal strength of the sidelink control information is compared with the second threshold, and when the signal strength of the sidelink control information is greater than or equal to the second threshold, it is considered that all the resources in the second resource set are unavailable resources.

In a possible implementation, the first threshold and/or the second threshold are/is preset, or the first threshold and/or the second threshold are/is determined based on a service priority of the second device and a service priority of the third device.

In a possible implementation, the first information carries the first indication field, and information in the first indication field is used to indicate that the first resource set is for receiving data.

In a possible implementation, the sidelink control information carries the second indication field, and the second indication field is used to indicate that the second resource set is for sending data.

Based on the foregoing technical solution, the first indication field is used to indicate that the resource in the first resource set is to be used, to receive data, by a terminal device that sends the first information; and the second indication field is used to indicate that the resource in the second resource set is to be used, to send data, by a terminal device that sends the sidelink control information. In this way, a terminal device that receives information can determine, based on the first indication field or the second indication field, that the received information is from a terminal device that is about to sending data or a terminal device configured to receive data, so that the terminal device that receives the information can determine, according to different rules for different sources of the received information, whether a resource indicated by the received information can be used.

In a possible implementation, the first indication field is a format field in the first information, and a value of the format field in the first information is different from a value of a format field in the sidelink control information.

Based on the foregoing technical solution, the value of the format field in the first information is used to indicate that the first information is from the terminal device configured to receive data, and the value of the format field in the sidelink control information is set to be different from the value of the format field in the first information, to indicate the different sources of the information to the terminal device that receives the information.

In a possible implementation, the receiving first information includes: receiving the first information on a resource in a third resource set, where the third resource set is different from a fourth resource set and/or is different from a fifth resource set, the fourth resource set is a resource set for sending sidelink control information, and the fifth resource set is a resource set for sending an acknowledgment/negative acknowledgment ACK/NACK.

In a possible implementation, the receiving first information includes: receiving the first information on a resource in a third resource set, where the third resource set is a subset of a fourth resource set or is a subset of a fifth resource set, the fourth resource set is a resource set for sending sidelink control information, and the fifth resource set is a resource set for sending an acknowledgment/negative acknowledgment ACK/NACK.

Based on the foregoing technical solution, a terminal device that sends the information indicates, by using a resource set in which a resource carrying the information is located, that the information received by the terminal device is from the device configured to send data or the device configured to receive data, so that the terminal device that receives the information can determine, based on the resource set in which the resource carrying the information is located, that the received information is from the device configured to send data or the device configured to receive data.

The third resource set, the fourth resource set, and the fifth resource set may be configured by a network device by using signaling. For example, the network device may configure the third resource set for any one of the second device, the first device, and the third device by using at least one of RRC signaling, MAC signaling, and physical layer signaling. Correspondingly, the first device, the second device, or the third device may obtain configuration information sent by the network device, and determine, based on the configuration information, the third resource set configured by the network device for the first device, the second device, or the third device. In other words, the network device may configure, for any terminal device operating on the sidelink, the third resource set by using at least one of RRC signaling, MAC signaling, and physical layer signaling. Correspondingly, the terminal device operating on the sidelink may obtain configuration information sent by the network device, and determine, based on the configuration information, the third resource set configured by the network device for the terminal device operating on the sidelink. Similarly, the network device may configure the fifth resource set for any one of the second device, the first device, and the third device by using at least one of RRC signaling, MAC signaling, or physical layer signaling. Correspondingly, the first device, the second device, or the third device may obtain configuration information sent by the network device, and determine, based on the configuration information, the fifth resource set configured by the network device for the first device, the second device, or the third device. In other words, the network device may configure, for any terminal device operating on the sidelink, the fifth resource set by using at least one of RRC signaling, MAC signaling, and physical layer signaling. Correspondingly, the terminal device operating on the sidelink may obtain configuration information sent by the network device, and determine, based on the configuration information, the fifth resource set configured by the network device for the terminal device operating on the sidelink. The fifth resource set is a resource set, on the sidelink, used for sending an acknowledgment/negative acknowledgment ACK/NACK. The fifth resource set may be different from a resource set, configured for a Uu interface, used for sending an acknowledgment/negative acknowledgment ACK/NACK. The Uu interface is an interface for direct communication between the network device and the terminal device.

According to a fourth aspect, a transmission resource determining method is provided. The method may be performed by a terminal device, or may be performed by a chip disposed in a terminal device. This is not limited in this application. It should be noted that the terminal device herein corresponds to a second device below.

Specifically, the method includes: determining first information, where the first information includes indication information of a first resource set, and the first resource set is for receiving data; and sending the first information on a resource in a third resource set, where the third resource set is a resource set for sending sidelink control information, a resource set for sending an acknowledgment/negative acknowledgment ACK/NACK, or a resource set separately configured for the first information.

Based on the foregoing technical solution, a terminal device that sends information indicates, by using a resource set in which a resource carrying the information is located, that the information received by a terminal device is from a device configured to send data or a device configured to receive data, so that the terminal device that receives the information can determine, based on the resource set in which the resource carrying the information is located, that the received information is from the device configured to send data or the device configured to receive data.

In a possible implementation, the sending the first information on a resource in a third resource set includes: sending the first information on a resource in a subset of the third resource set.

In a possible implementation, the method further includes: obtaining configuration information, where the configuration information is used to indicate the third resource set and/or a fifth resource set.

The third resource set, a resource set (which may be denoted as a fourth resource set) for sending sidelink control information, and a resource set (which may be denoted as the fifth resource set) for sending an acknowledgment/negative acknowledgment ACK/NACK may be configured by a network device by using signaling. For example, the network device may configure the third resource set for any one of the second device, a first device, and a third device by using at least one of RRC signaling, MAC signaling, and physical layer signaling. Correspondingly, the first device, the second device, or the third device may obtain configuration information sent by the network device, and determine, based on the configuration information, the third resource set configured by the network device for the first device, the second device, or the third device. In other words, the network device may configure, for any terminal device operating on a sidelink, the third resource set by using at least one of RRC signaling, MAC signaling, and physical layer signaling. Correspondingly, the terminal device operating on the sidelink may obtain configuration information sent by the network device, and determine, based on the configuration information, the third resource set configured by the network device for the terminal device operating on the sidelink.

Similarly, the network device may configure the fifth resource set for any one of the second device, the first device, and the third device by using at least one of RRC signaling, MAC signaling, or physical layer signaling. Correspondingly, the first device, the second device, or the third device may obtain configuration information sent by the network device, and determine, based on the configuration information, the fifth resource set configured by the network device for the first device, the second device, or the third device. In other words, the network device may configure, for any terminal device operating on the sidelink, the fifth resource set by using at least one of RRC signaling, MAC signaling, and physical layer signaling. Correspondingly, the terminal device operating on the sidelink may obtain configuration information sent by the network device, and determine, based on the configuration information, the fifth resource set configured by the network device for the terminal device operating on the sidelink. The fifth resource set is a resource set, on the sidelink, used for sending an acknowledgment/negative acknowledgment ACK/NACK. The fifth resource set may be different from a resource set, configured for a Uu interface, used for sending an acknowledgment/negative acknowledgment ACK/NACK. The Uu interface is an interface for direct communication between the network device and the terminal device.

In a possible implementation, before the sending the first information on a resource in a third resource set, the method further includes: receiving sidelink control information sent by the second device, where the sidelink control information includes indication information of a second resource set and a second indication field, the second indication field is used to indicate that the second resource set is for sending data, and the first resource set is a subset of the second resource set.

Based on the foregoing technical solution, the second device sends the sidelink control information. Correspondingly, the first device receives the sidelink control information sent by the second device. In this case, the first device may determine the first information based on the sidelink control information. For example, the first device may determine a subset of the second resource set as the first resource set.

It should be noted that, in this embodiment of this application, the first resource set may be a subset of the second resource set. In this case, there may be two cases: A part of resources in the first resource set are a subset of the second resource set; and all resources in the first resource set are a subset of the second resource set. However, this embodiment of this application is not limited thereto. For example, when determining, after measuring resources in the second resource set, that all the resources in the second resource set are unavailable, the first device may determine the resources in the first resource set, that is, none of the resources in the first resource set may belong to the second resource set.

In a possible implementation, the sidelink control information includes at least one of the following: the resource for sending the first information, a time domain position for sending the first information, and a sequence of sending first information by a plurality of devices in a first communication group. The first communication group is a groupcast communication group to which the first device belongs, and the plurality of devices include the first device.

Based on the foregoing technical solution, the sidelink control information may be used to indicate the resource carrying the first information when the terminal device sends the first information and/or the time domain position for sending the first information when the terminal device sends the first information. When the first device is a device in the groupcast communication group, the sidelink control information may further be used to indicate a sequence of sending first information by a plurality of terminal devices that receive the sidelink control information, so that the plurality of terminal devices that receive the sidelink control information send the first information in the sequence indicated by the sidelink control information.

In a possible implementation, before the sending the first information, the method further includes: receiving the sidelink control information sent by the second device, where the sidelink control information includes second information, and the second information is used to indicate to send the first information; or receiving third information sent by the network device, where the third information is used to indicate to send the first information.

Based on the foregoing technical solution, the first device may be triggered to send the first information. The sidelink control information may be used to indicate the first device to send the first information. In addition, the third information sent by the network device may alternatively be used to indicate the first device to send the first information.

Optionally, the second information may be an indication field, included in the sidelink control information, used to indicate whether to send the first information. In other words, the indication field, included in the sidelink control information, used to indicate whether to send the first information is trigger information, and the first device determines, based on the trigger information, whether to send the first information. For example, when the indication field, included in the sidelink control information, used to indicate whether to send the first information is set to 1, it indicates that a device that receives the sidelink control information needs to send the first information. When the indication field, included in the sidelink control information, used to indicate whether to send the first information is set to 0, it indicates that a device that receives the sidelink control information does not need to send the first information.

Optionally, the third information may be control information sent by the network device, and the control information may include an indication field used to indicate whether to send the first information. In other words, the indication field, included in the control information, used to indicate whether to send the first information is trigger information, and the first device determines, based on the trigger information, whether to send the first information. For example, when the indication field used to indicate whether to send the first information is set to 1, it indicates that a device that receives the sidelink control information or a receiving device performing sidelink communication needs to send the first information. When the indication field used to indicate whether to send the first information is set to 0, it indicates that a device that receives the sidelink control information or a receiving device performing sidelink communication does not need to send the first information.

According to a fifth aspect, a transmission resource determining apparatus is provided. The transmission resource determining apparatus includes each module or unit configured to perform the method according to any possible implementation of the first aspect or any possible implementation of the fourth aspect.

According to a sixth aspect, a transmission resource determining apparatus is provided. The transmission resource determining apparatus may be the first device in the foregoing method designs, or may be a chip disposed in the first device. The transmission resource determining apparatus includes a processor. The processor is coupled to a memory, and may be configured to execute an instruction in the memory, to implement the method according to any possible implementation of the first aspect or any possible implementation of the fourth aspect. Optionally, the transmission resource determining apparatus further includes the memory. Optionally, the transmission resource determining apparatus further includes a communications interface, and the processor is coupled to the communications interface.

In an implementation, the transmission resource determining apparatus is the first device. When the transmission resource determining apparatus is the first device, the communications interface may be a transceiver or an input/output interface.

In another implementation, the transmission resource determining apparatus is the chip disposed in the first device. When the transmission resource determining apparatus is the chip disposed in the first device, the communications interface may be an input/output interface.

Optionally, the transceiver may be a transceiver circuit. Optionally, the input/output interface may be an input/output circuit.

According to a seventh aspect, a transmission resource determining apparatus is provided. The transmission resource determining apparatus includes each module or unit configured to perform the method according to any possible implementation of the second aspect.

According to an eighth aspect, a transmission resource determining apparatus is provided. The transmission resource determining apparatus may be the second device in the foregoing method designs, or may be a chip disposed in the second device. The transmission resource determining apparatus includes a processor. The processor is coupled to a memory, and may be configured to execute an instruction in the memory, to implement the method according to any possible implementation of the second aspect. Optionally, the transmission resource determining apparatus further includes the memory. Optionally, the transmission resource determining apparatus further includes a communications interface, and the processor is coupled to the communications interface.

In an implementation, the transmission resource determining apparatus is the second device. When the transmission resource determining apparatus is the second device, the communications interface may be a transceiver or an input/output interface.

In another implementation, the transmission resource determining apparatus is the chip disposed in the second device. When the transmission resource determining apparatus is the chip disposed in the second device, the communications interface may be an input/output interface.

Optionally, the transceiver may be a transceiver circuit. Optionally, the input/output interface may be an input/output circuit.

According to a ninth aspect, a transmission resource determining apparatus is provided. The transmission resource determining apparatus includes each module or unit configured to perform the method according to any possible implementation of the third aspect.

According to a tenth aspect, a transmission resource determining apparatus is provided. The transmission resource determining apparatus may be the third device in the foregoing method designs, or may be a chip disposed in the third device. The transmission resource determining apparatus includes a processor. The processor is coupled to a memory, and may be configured to execute an instruction in the memory, to implement the method according to any possible implementation of the third aspect. Optionally, the transmission resource determining apparatus further includes the memory. Optionally, the transmission resource determining apparatus further includes a communications interface, and the processor is coupled to the communications interface.

In an implementation, the transmission resource determining apparatus is the third device. When the transmission resource determining apparatus is the third device, the communications interface may be a transceiver or an input/output interface.

In another implementation, the transmission resource determining apparatus is the chip disposed in the third device. When the transmission resource determining apparatus is the chip disposed in the third device, the communications interface may be an input/output interface.

Optionally, the transceiver may be a transceiver circuit. Optionally, the input/output interface may be an input/output circuit.

According to an eleventh aspect, a computer program product is provided. The computer program product includes a computer program (which may also be referred to as code or an instruction). When the computer program is run, a computer is enabled to perform the method according to any one of the first aspect, the second aspect, the third aspect, the fourth aspect, or the possible implementations of the first aspect, the second aspect, the third aspect, or the fourth aspect.

According to a twelfth aspect, a computer-readable medium is provided. The computer-readable medium stores a computer program (which may also be referred to as code or an instruction). When the computer program is run on a computer, the computer is enabled to perform the method according to any one of the first aspect, the second aspect, the third aspect, the fourth aspect, or the possible implementations of the first aspect, the second aspect, the third aspect, or the fourth aspect.

According to a thirteenth aspect, a communications system is provided. The communications system includes the foregoing second device, the foregoing first device, and the foregoing third device.

DETAILED DESCRIPTION OF ILLUSTRATIVE EMBODIMENTS

The following describes technical solutions of this application with reference to the accompanying drawings.

The technical solutions of the embodiments of this application may be applied to various communications systems, such as a future 5th generation (5G) system or a new radio (NR) system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), and a worldwide interoperability for microwave access (WiMAX) communications system. The technical solutions of the embodiments of this application may further be applied to device-to-device (device to device, D2D) communication, machine-to-machine (machine to machine, M2M) communication, machine type communication (MTC), and communication in an internet-of-vehicles system. A communication mode in the internet-of-vehicles system is collectively referred to as vehicle-to-everything (V2X) communication, where X represents everything. For example, the V2X communication includes vehicle-to-vehicle (vehicle to vehicle, V2V) communication, vehicle-to-infrastructure (vehicle to infrastructure, V2I) communication, vehicle-to-pedestrian (vehicle to pedestrian, V2P) communication, or vehicle-to-network (vehicle to network, V2N) communication.

To facilitate understanding of the embodiments of this application, a communications system to which an embodiment of this application is applicable is first described in detail with reference to FIG. 2.

Figure 2:
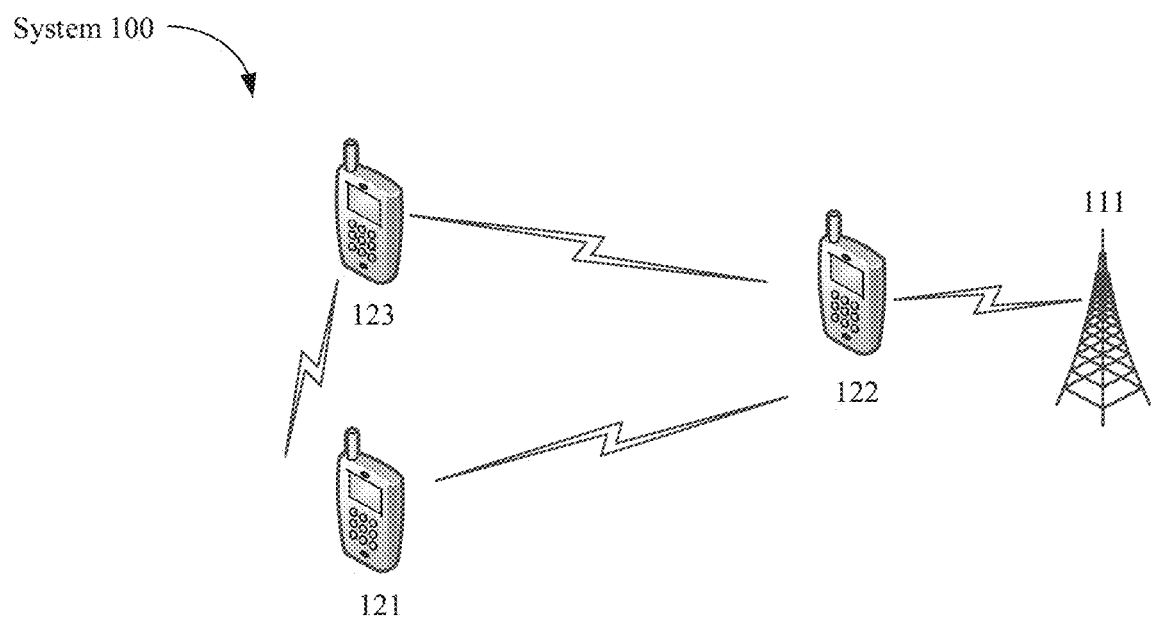
FIG. 2 is a schematic diagram of a communications system to which an embodiment of this application is applicable.

FIG. 2 is another schematic diagram of a wireless communications system 100 to which an embodiment of this application is applicable. As shown in FIG. 2, the technical solutions of the embodiments of this application may further be applied to the D2D communication.

With development of wireless communications technologies, people have increasing requirements for a high data rate and user experience, and have increasing requirements for a proximity service for knowing people or things around and communicating with them. Therefore, a D2D technology emerges. Application of the D2D technology can alleviate load of a cellular network, reduce battery power consumption of a terminal device, improve the data rate, and well meet the requirements for the proximity service. The D2D technology can allow a plurality of terminal devices that support a D2D function to send a signal to and receive a signal from each other regardless of whether there is a network infrastructure. In view of characteristics and advantages of the D2D technology, an internet-of-vehicles application scenario based on the D2D technology is proposed. For example, in a network of an LTE technology proposed in the 3rd generation partnership project (3GPP), a V2X internet-of-vehicles technology is proposed. The V2X communication is communication between a vehicle and everything outside the vehicle, and includes the V2V communication, the V2P communication, the V2I communication, and the V2N communication.

As shown in FIG. 2, the wireless communications system 100 includes a plurality of terminal devices, for example, a terminal device 121 to a terminal device 123 in FIG. 2. The terminal device 121 to the terminal device 123 may directly communicate with each other. For example, the terminal device 121 and the terminal device 122 may separately or simultaneously send data to the terminal device 123. The wireless communications system further includes one or more network devices, for example, a network device 11 in FIG. 2. All the terminal device 121 to the terminal device 123 may communicate with the network device 11. For example, in FIG. 2, the network device 11 communicates with the terminal device 122.

It should be understood that the network device in the wireless communications system may be any device that has a wireless transceiver function and that can provide a wireless communication service for the terminal device. The network device includes but is not limited to: a base station (BS), an evolved NodeB (evolved Node B, eNB), a radio network controller (RNC), a NodeB (Node B, NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (TP), a transmission reception point (TRP), or the like; or may be a gNB or a transmission point (TRP or TP) in a 5G system such as an NR system, or one antenna panel or a group of antenna panels (including a plurality of antenna panels) of a base station in a 5G system; or may be a network node, such as a baseband unit (BBU) or a distributed unit (DU), that constitutes a gNB or a transmission point.

In some deployments, the gNB may include a centralized unit (CU) and the DU. The gNB may further include a radio frequency unit (or also called radio unit, RU). The CU implements a part of functions of the gNB, and the DU implements a part of the functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the network device may be a CU node, a DU node, or a device including a CU node and a DU node. In addition, the CU may be classified as a network device in an access network (for example, radio access network, RAN), or may be classified as a network device in a core network (CN). This is not limited in this application.

It should be further understood that the terminal device in the wireless communications system may also be referred to as user equipment (UE), an access terminal, a subscriber unit, a subscriber station, a mobile station, a remote station, a remote terminal, a mobile device, a user terminal, a terminal, a wireless communications device, a user agent, a user apparatus, or the like. The terminal device in the embodiments of this application may be a mobile phone, a tablet computer (for example, Pad), a computer having a wireless transceiver function, a virtual reality (VR) terminal device, an augmented reality (AR) terminal device, a wireless terminal in industrial control, a wireless terminal in self driving, a wireless terminal in telemedicine (or also called remote medical), a wireless terminal in a smart grid, a wireless terminal in transportation safety, a wireless terminal in a smart city, a wireless terminal in a smart home, a vehicle-mounted communications device, or the like. An application scenario is not limited in the embodiments of this application.

It should be understood that FIG. 2 schematically shows the terminal device 121 to the terminal device 123 and the network device 111 merely for ease of description, but this should not constitute any limitation on this application. The wireless communications system may further include more network devices, or may include more or fewer terminal devices. This is not limited in this application.

Sidelink (SL) transmission in a V2X system is used as an example. A resource used by a terminal device during data transmission may be scheduled by a network device, or may be sensed (sensing) by the terminal device. When determining the resource through sensing, the terminal device usually performs determining for a sensed resource according to a specific rule. For example, the terminal device determines whether signal strength of a received signal detected on the resource meets a specific signal strength requirement, and if determining that the signal strength of the received signal detected on the resource meets the signal strength requirement, determines that the sensed resource can be used.

Figure 1:
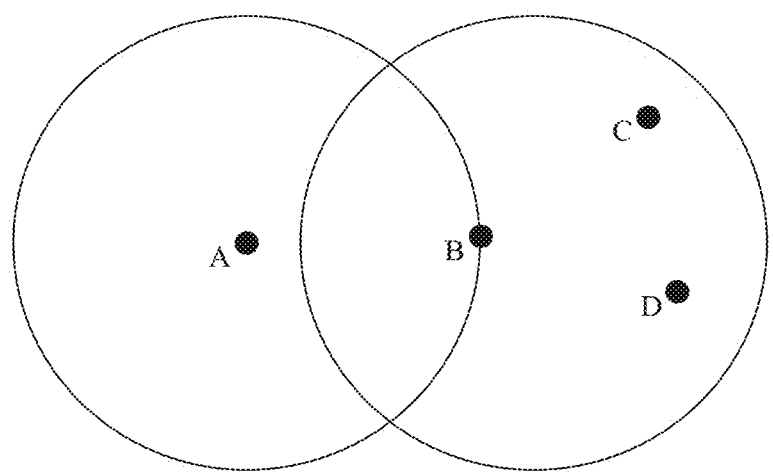
FIG. 1 is a schematic diagram of a hidden node/an exposed node.

However, a hidden node problem (HTP) and an exposed node problem (ETP) may exist on an SL. As shown in FIG. 1, a terminal device #A sends information to a terminal device #B. The information is used to indicate a resource used by the terminal device #A when the terminal device #A transmits data to the terminal device #B, and the information is received by the terminal device #B. Because a terminal device #C is not within coverage of the terminal device #A, when the terminal device #C communicates with a terminal device #D, the terminal device #C cannot detect transmission between the terminal device #A and the terminal device #B, and a resource sensed during the communication between the terminal device #C and the terminal device #D may be the resource indicated by the information sent by the terminal device #A. In this case, the terminal device #C and the terminal device #D may perform transmission on the resource indicated by the information. Consequently, interference is caused to reception performed by the terminal device #B. The terminal device #C is a hidden node.

In addition, for a terminal device #E that can detect the transmission between the terminal device #A and the terminal device #B, after receiving the information sent by the terminal device #A, the terminal device #E determines that the resource indicated by the information has been occupied by the terminal device #A, and remains silent or is free from access on the resource indicated by the information.

However, for a terminal device within the coverage of the terminal device #A, even if some terminal devices (for example, the terminal device #E) use the resource indicated by the information, interference is not caused to the reception performed by the terminal device #B. Therefore, if the terminal device #E remains silent or is free from access on the resource indicated by the information, an exposed node problem exists, and the terminal device #E is an exposed node.

In view of this, this application provides a transmission resource determining method, to resolve a hidden node problem and an exposed node problem on an SL in a V2X system, improve resource sensing efficiency, and more properly use a sidelink resource.

To facilitate understanding of this application, several concepts in this application are first described briefly before the embodiments of this application are described.

1. Resource element (RE): The resource element occupies one symbol in time domain, and occupies one subcarrier in frequency domain.

2. Resource block (RB): One RB occupies $N_{SC}^{RB}$ consecutive subcarriers in frequency domain, and occupies $N_{symbol}^{RB}$ consecutive symbols in time domain. $N_{SC}^{RB}$ and $N_{symbol}^{RB}$ are both positive integers. For example, in an LTE protocol, is equal $N_{SC}^{RB}$ to 12, and $N_{symbol}^{RB}$ is equal to 7. In an NR protocol, $N_{SC}^{RB}$ is equal to 12, and $N_{symbol}^{RB}$ is equal to 14. It should be understood that, in a communications protocol evolution process, $N_{SC}^{RB}$ and $N_{symbol}^{RB}$ may have different values. This is not limited in this application. In the embodiments of this application, the RB may be an example of a resource unit.

3. Symbol: a minimum unit of a time domain resource. A time length of one symbol is not limited in the embodiments of this application. A length of one symbol may vary for different subcarrier spacings. Symbols may include an uplink symbol and a downlink symbol. By way of example rather than limitation, the uplink symbol may be referred to as a single-carrier frequency division multiple access (SC-FDMA) symbol or an orthogonal frequency division multiplexing (OFDM) symbol, and the downlink symbol may be referred to as an OFDM symbol.

4. Slot (slot): In an NR system, the slot is a minimum scheduling unit of time. In a slot format, the slot includes 14 OFDM symbols, and a cyclic prefix (CP) of each OFDM symbol is a normal CP (normal cyclic prefix). In another slot format, the slot includes 12 OFDM symbols, and a CP of each OFDM symbol is an extended CP (extended cyclic prefix). In still another slot format, the slot includes seven OFDM symbols, and a CP of each OFDM symbol is a normal CP. All OFDM symbols in one slot may be used for uplink transmission, or may be used for downlink transmission. Alternatively, a part of OFDM symbols in one slot may be used for downlink transmission, a part of the OFDM symbols may be used for uplink transmission, and a part of the OFDM symbols are flexible symbols or reserved symbols. The flexible symbol or the reserved symbol may be used for sidelink transmission. It should be understood that the foregoing examples are merely examples for description, and shall not constitute any limitation on this application. In consideration of system forward compatibility, a slot format is not limited to the foregoing examples.

5. Sidelink control information (SCI): A sidelink (SL) is a transmission link between terminal devices. For example, in the system 100 shown in FIG. 2, on the SL, data transmission between the terminal devices is not forwarded via a network device.

In addition, to facilitate understanding of the embodiments of this application, the following several descriptions are provided.

First, in the embodiments described below, "first", "second", and "third" are merely intended to distinguish between different objects, and shall not constitute any limitation on this application, and for example, are intended to distinguish between different information and different resource sets.

Second, in the embodiments described below, the term "protocol" may be a standard protocol in the communications field, and for example, may include an LTE protocol, a 5G protocol or an NR protocol, and a related protocol applied to a future communications system. This is not limited in this application.

Third, in the embodiments described below, the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, the term "at least one of A and B" may represent the following three cases: Only A exists, both A and B exist, and only B exists.

Fourth, in the embodiments described below, the term "at least one" may represent "one or more". For example, that at least one of a manner A, a manner B, or a manner C is used for implementation represents that the manner A may be used for implementation, the manner B may be used for implementation, or the manner C may be used for implementation; or may represent that the manner A and the manner B may be used for implementation, the manner B and the manner C may be used for implementation, or the manner A and the manner C may be used for implementation; or may represent that the manner A, the manner B, and the manner C may be used for implementation. Similarly, "at least two" may represent "two or more". The technical solutions provided in this application are described in detail below with reference to the accompanying drawings.

The transmission resource determining method provided in the embodiments of this application is described in detail below with reference to the accompanying drawings.

It should be understood that the transmission resource determining method provided in this application may be applied to a wireless communications system, for example, the system 100 shown in FIG. 2, and may be applied to communication between at least two terminal devices.

Without loss of generality, the following describes the embodiments of this application in detail by using a process of interaction among a second device, a first device, and a third device as an example. The third device is within coverage of the second device (where in this case, the third device may not be within coverage of the first device). Alternatively, the third device is within coverage of the first device (where in this case, the third device may not be within coverage of the second device). Alternatively, the third device is within coverage of both the second device and the first device. For example, the second device may be the terminal device 122 in the system 100 shown in FIG. 2, the first device may be the terminal device 121 in the system 100 shown in FIG. 1, and the third device may be the terminal device 123 in the system 100 shown in FIG. 1. It may be understood that any terminal device in a wireless communications system such as the wireless communications system 100 may implement wireless communication based on a same technical solution. This is not limited in this application.

Figure 3:
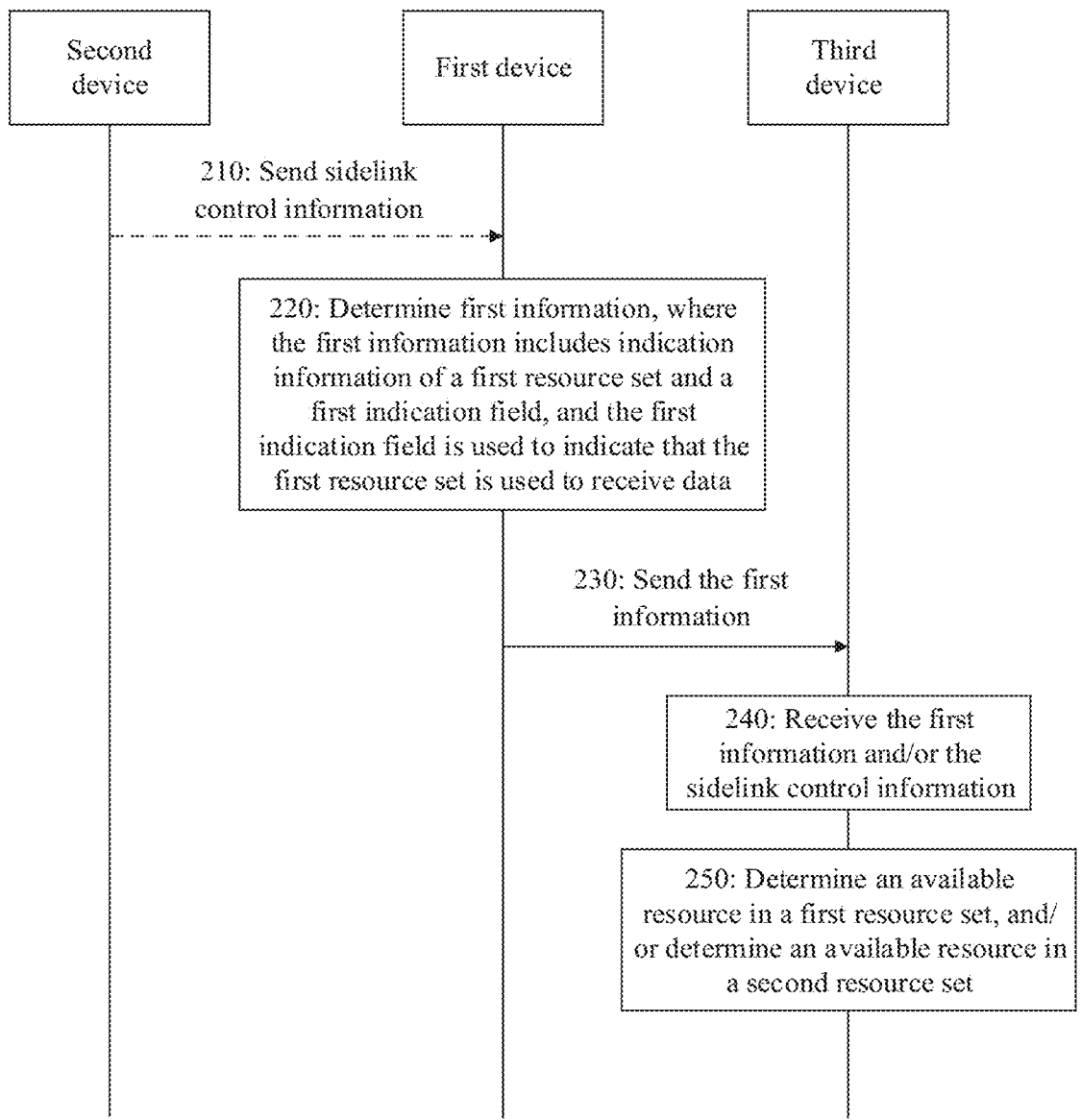
FIG. 3 is a schematic flowchart of a transmission resource determining method according to an embodiment of this application.

FIG. 3 is a schematic flowchart of a transmission resource determining method 200 according to an embodiment of this application, and is illustrated from the perspective of device interaction. As shown in FIG. 3, the method 200 may include step 210 to step 260. The following describes the steps in the method 200 in detail.

Step 220: A first device determines first information, where the first information includes indication information of a first resource set and a first indication field, and the first indication field is used to indicate that the first resource set is for receiving data. And Step 230: The first device sends the first information.

By way of example rather than limitation, a resource set (for example, the first resource set to a fifth resource set, where the second resource set to the fifth resource set are in the following descriptions) in this embodiment of this application may include one or more resource units, and the resource unit may include, for example, an RB, a resource block group (RB group, RBG) including one or more RBs, one or more RB pairs, half an RB, ¼ of an RB, or an RE group including one or more REs. In an NR protocol, one RB includes 12 consecutive subcarriers in frequency domain and 14 consecutive symbols in time domain. A resource in each resource set may be at least one of a time domain resource, a frequency domain resource, and a space domain resource.

Specifically, after generating the first information, the first device may send the first information to a second device. The first information includes the indication information of the first resource set, and the indication information of the first resource set is used to indicate the first resource set.

Optionally, the indication information of the first resource set may be directly included in the first information, or may be included in other control information included in the first information, where the control information may be information further indicated in the first information.

Optionally, the indication information of the first resource set may include information about the time domain resource, the frequency domain resource, or the space domain resource. Alternatively, the indication information of the first resource set may include an identifier corresponding to the time domain resource, the frequency domain resource, or the space domain resource. The identifier corresponding to the time domain resource, the frequency domain resource, or the space domain resource may be an index value, and a correspondence between the index value and the time domain resource, the frequency domain resource, or the space domain resource may be preconfigured.

It should be noted that preconfiguration in this application may be understood as pre-notification performed by a network device or a specific terminal device by using signaling, or preset on each device. The signaling may be at least one of radio resource control (RRC) signaling, media access control (MAC) signaling, or physical layer signaling.

Optionally, the first information may include the first indication field. The first indication field is used to indicate that the first device is about to receiving data on a resource in the first resource set. In other words, the first indication field is used to indicate that the first resource set is to be used, by a device that sends the first information, to receive data, so that the second device sends data to the first device on the resource in the first resource set based on the first information. Optionally, the first information may further include a feedback from the first device for channel sounding of the resource in the first resource set.

It should be noted that the resource in the first resource set may be scheduled by the first device, as described in the foregoing solution. The resource scheduled by the first device may be a resource selected based on channel detection performed by the first device. In addition, the first device may alternatively determine the first resource set based on sidelink control information sent by the second device. In this case, the method 200 may further include step 210 before step 220.

Step 210: The second device sends the sidelink control information, where the sidelink control information includes indication information of a second resource set, the indication information of the second resource set is used to indicate the second resource set, and the second resource set is for sending data. Correspondingly, the first device receives the sidelink control information sent by the second device.

Specifically, the first device receives the sidelink control information sent by the second device, where the sidelink control information includes the indication information of the second resource set, and the indication information of the second resource set is used to indicate the second resource set.

Optionally, the indication information of the second resource set may be directly included in the sidelink control information, or may be included in other control information included in the sidelink control information, where the control information may be information further indicated in the sidelink control information.

Optionally, the second resource set indicated by the indication information of the second resource set may not only include information about a resource scheduled currently, but also include a subsequently scheduled resource. The subsequently scheduled resource may be one or more resources subsequently scheduled for one or more times. That is, the sidelink control information may be control information sent for current scheduling, or control information sent for one or more times of scheduling, or control information sent for one or more times of scheduling in one window.

Optionally, the sidelink control information may include a second indication field. The second indication field is used to indicate that the second device sends data on a resource in the second resource set. In other words, the second indication field is used to indicate that the second resource set is to be used, by a device that sends the sidelink control information, to send data. In this case, in step 220, after receiving the sidelink control information, the first device may determine a resource to be actually used to receive the data sent by the second device, and the resource, in the second resource set, to be actually used to receive the data sent by the second device constitutes the first resource set. In addition, the first device includes, in the first information, the indication information of the first resource set and the first indication field, and sends the first information in step 230, to indicate, to the second device by using the first information, that the first device is about to receiving the data on the resource in the first resource set.

Optionally, in an embodiment, sending of the first information by a terminal device may not be supported in a communications system. In this case, the second device is used as an example, and the transmission resource determining method includes step 210. Content of the sidelink control information is described above, and details are not described herein again. Another terminal device in coverage of the second device may detect the sidelink control information sent by the second device, and determine an available resource in the second resource set, to avoid a resource conflict and improve sensing efficiency.

The first resource set may be a subset of the second resource set. In this case, there may be two cases: A part of resources in the first resource set are a subset of the second resource set; and all resources in the first resource set are a subset of the second resource set. However, this embodiment of this application is not limited thereto. For example, when determining, after sensing resources in the second resource set, that all the resources in the second resource set are unavailable, the first device may determine the resources in the first resource set, that is, none of the resources in the first resource set may belong to the second resource set. When receiving the first information sent by the first device, the second device determines the first resource set based on the indication information of the first resource set, and sends the data on the resource in the first resource set.

Optionally, the first resource set may include one or more resources. Optionally, the second resource set may include one or more resources.

Optionally, the first information may include a feedback from the first device for channel sounding of the resource in the second resource set. The feedback from the first device for the channel sounding of the resource in the second resource set may be any one or more of a channel quality indicator (CQI), a precoding matrix indication (PMI), a rank indication (RI), reference signal received quality (RSRQ), reference signal received power (RSRP), or a measured path loss (PL).

Optionally, the sidelink control information may include a feedback timing of feedback information. The feedback timing may be a fixed time, or may be a flexible time. The feedback information may be one or more of a hybrid automatic repeat request (HARQ), the first information, and channel state information (CSI). The HARQ generally includes an acknowledgment (ACK) or a negative acknowledgment (NACK). When the feedback information is the ACK or the NACK, the feedback information is carried on a sidelink feedback channel (for example, physical sidelink feedback channel, PSFCH). In other words, when the feedback information is the ACK or the NACK, the feedback information is information included on the PSFCH. The fixed time is preconfigured, and is dynamically activated by the sidelink control information; or the fixed time is specified in the sidelink control information. Preconfigured times may be some fixed moments that are pre-notified by using RRC signaling. There may be one or more fixed moments, and the fixed moment may have a corresponding index value (index), so that a corresponding index can be used to perform an activation operation during activation. When the feedback timing indicated in the sidelink control information is the fixed time, the first device sends, at the determined time, the feedback information on an available resource that is sensed. When the feedback timing indicated in the sidelink control information is the flexible time, the first device sends, at the flexible time, the feedback information on an available resource that is sensed. Resource sensing manners include sensing (sensing/measurement), listen before talk (LBT), SCI interpretation, and the like.

The flexible moment includes a plurality of moments. For example, when the flexible moment includes N moments, the N moments are the first moment, the second moment, . . . , and the $N^{th}$ moment. That the first device sends, at the flexible moment, the feedback information on an available resource that is sensed includes: When no available resource that can be used to send the feedback information is sensed at the first moment, sensing is performed at the second moment, the rest can be deduced by analogy until a resource that can be used to send the feedback information is found, and the feedback information is sent at a corresponding moment. A representation method for the first moment, the second moment, . . . , and the $N^{th}$ moment may be: 1. The first moment is a reference moment, the second moment is an offset relative to the first moment, the third moment is an offset relative to the first moment, . . . , and the $N^{th}$ moment is an offset relative to the first moment. 2. The first moment is a reference moment, the second moment is an offset relative to the first moment, the third moment is an offset relative to the second moment, . . . , and the $N^{th}$ moment is an offset relative to the $(N-1)^{th}$ moment. 3. The first moment is a reference moment, there are a total quantity N of available moments, and each moment is an offset relative to a previous moment (for example, any $N^{th}$ moment is an offset relative to the $(N-1)^{th}$ moment). 4. The first moment may be an offset relative to a current moment at which the sidelink control information is sent, the second moment is an offset relative to the current moment at which the sidelink control information is sent, . . . , and the $N^{th}$ moment is an offset relative to the current moment at which the sidelink control information is sent. 5. The first moment may be an offset relative to a current moment at which the sidelink control information is sent, the second moment is an offset relative to the first moment, the third moment is an offset relative to the first moment, . . . , and the $N^{th}$ moment is an offset relative to the first moment. 6. The first moment may be an offset relative to a current moment at which the sidelink control information is sent, the second moment is an offset relative to the first moment, the third moment is an offset relative to the second moment, . . . , and the $N^{th}$ moment is an offset relative to the $(N-1)^{th}$ moment.

The reference moment may be an absolute moment value; an offset relative to a current frame, a current subframe, or a current slot in which the sidelink control information is located, where the offset may be in a unit of a subframe, a slot, a mini slot, or a symbol; or an offset relative to the current moment at which the sidelink control information is sent. The mini slot is several predefined symbols.

Optionally, the sidelink control information may include an indication field used to indicate whether to send the feedback information. To be specific, the indication field, included in the sidelink control information, used to indicate whether to send the feedback information is trigger information, and the first device may determine, based on the trigger information, whether to send the feedback information. For example, when the indication field used to indicate whether to send the feedback information is set to 1, it indicates that a device that receives the sidelink control information needs to send the feedback information. When the indication field used to indicate whether to send the feedback information is set to 0, it indicates that a device that receives the sidelink control information does not need to send the feedback information.

Optionally, the sidelink control information may include an indication field used to indicate whether determining of whether to send the feedback information needs to be performed based on a channel busy ratio (CBR). To be specific, the indication field used to indicate whether the determining of whether to send the feedback information needs to be performed based on the CBR is trigger information, and the first device may determine, based on the trigger information, whether the determining of whether to send the feedback information needs to be performed based on the CBR. For example, when the indication field used to indicate whether to send the feedback information is set to 1, it indicates that a device that receives the sidelink control information needs to determine, based on the CBR, whether to send the feedback information. When the indication field used to indicate whether to send the feedback information is set to 0, it indicates that a device that receives the sidelink control information does not need to determine, based on the CBR, whether to send the feedback information.

When the determining of whether to send the feedback information needs to be performed based on the CBR, the CBR may be compared with a preconfigured CBR threshold. When the CBR is greater than or equal to the CBR threshold, the feedback information does not need to be sent. When the CBR is less than the CBR threshold, the feedback information needs to be sent. Optionally, the indication field used to indicate whether to send the feedback information may not be included in the sidelink control information, and may be included in control information sent by the network device.

Similarly, the indication field used to indicate whether to send the feedback information is trigger information, and the first device determines, based on the trigger information, whether to send the feedback information. For example, when the indication field used to indicate whether to send the feedback information is set to 1, it indicates that the device that receives the sidelink control information or a receiving device performing SL communication needs to send the feedback information. When the indication field used to indicate whether to send the feedback information is set to 0, it indicates that the device that receives the sidelink control information or a receiving device performing SL communication does not need to send the feedback information. Optionally, the sidelink control information may include a type indication field or a target identifier indication field. The type indication field or the target identifier indication field may be used to indicate a communication type or a service type. The communication type or the service type may be one or more of unicast, groupcast, or broadcast. For example, when the target identifier indication field is different target IDs, it indicates that the communication type or the service type is the unicast, the groupcast, or the broadcast. Optionally, the sidelink control information may include a duration indication field, and the duration indication field is used to indicate a continuous effective time or a continuous effective window of the scheduling. Optionally, the first indication field in the first information may be a format field in the first information, the second indication field in the sidelink control information may be a format field in the sidelink control information, a value of the format field in the first information is different from a value of the format field in the sidelink control information, and a format of the first information may be the same as or different from a format of the sidelink control information.

For example, the sidelink control information may be SCI, the first information may be feedback information for the SCI, the value of the format field in the first information may be 5B or Y, and the value of the format field in the sidelink control information may be 5A or X.

In addition, the first indication field in the first information may alternatively be a field newly added to an original format of the first information. For example, an additional field may be added to the first information, and a value of the additional field that is added is used to indicate that the resource in the first resource set is for sending data by the first device, or is used to indicate that the resource in the first resource set is for receiving data by the first device.

In addition, the first indication field in the first information may alternatively be used to reinterpret a value of a reserved bit in the first information. For example, the reserved bit may be one bit. When a value of the bit is 0, it indicates that the resource in the first resource set is for sending data by the first device. When a value of the bit is 1, it indicates that the resource in the first resource set is for receiving data by the first device.

For example, the additional field that is added may occupy one bit. When a value of the bit is 0, it indicates that the resource in the first resource set is for sending data by the first device. When a value of the bit is 1, it indicates that the resource in the first resource set is for receiving data by the first device.

Optionally, the sidelink control information may include second information, and the second information is used to indicate to send the first information. For example, the second information is used to activate sending of the first information by the first device. After receiving the sidelink control information, sent by the second device, including the second information, the first device sends the first information based on the second information.

Optionally, the second information may be an indication field, included in the sidelink control information, used to indicate whether to send the first information. In other words, the indication field, included in the sidelink control information, used to indicate whether to send the first information is trigger information, and the first device determines, based on the trigger information, whether to send the first information. For example, when the indication field, included in the sidelink control information, used to indicate whether to send the first information is set to 1, it indicates that the device that receives the sidelink control information needs to send the first information. When the indication field, included in the sidelink control information, used to indicate whether to send the first information is set to 0, it indicates that the device that receives the sidelink control information does not need to send the first information.

Optionally, the first device may alternatively receive third information from the network device. The third information is used to indicate to send the first information. For example, the first device receives the third information sent by the network device, and sends the first information based on the received third information.

Optionally, the third information may be control information sent by the network device, and the control information may include an indication field used to indicate whether to send the first information. In other words, the indication field, included in the control information, used to indicate whether to send the first information is trigger information, and the first device determines, based on the trigger information, whether to send the first information. For example, when the indication field used to indicate whether to send the first information is set to 1, it indicates that the device that receives the sidelink control information or the receiving device performing SL communication needs to send the first information. When the indication field used to indicate whether to send the first information is set to 0, it indicates that the device that receives the sidelink control information or the receiving device performing SL communication does not need to send the first information.

In this embodiment of this application, the first device may alternatively indicate, by using a resource set in which a resource carrying the first information is located, that the resource in the first resource set is for receiving data by the first device, and the second device may alternatively indicate, by using a resource set in which a resource carrying the sidelink control information is located, that the resource in the second resource set is for sending data by the second device. It should be noted that the method for indicating that the resource in the first resource set is for receiving data by the first device and for indicating that the resource in the second resource set is for sending data by the second device may be separately used or used in combination with the foregoing method for indicating, by using the first indication field carried in the first information, that the resource in the first resource set is for receiving data by the first device and for indicating, by using the second indication field carried in the sidelink control information, that the resource in the second resource set is for sending data by the second device. For example, only the first indication field carried in the first information may be used to indicate that the resource in the second resource set is for receiving data by the first device, or only the resource set in which the resource carrying the first information is located may be used to indicate that the resource in the first resource set is for receiving data by the first device, or both the first indication field carried in the first information and the resource set in which the resource carrying the first information is located may be used, that is, double indication may be performed. This is not particularly limited in this embodiment of this application.

In step 230, the first device may send the first information on a resource in a third resource set, where the third resource set is different from a fourth resource set and/or is different from a fifth resource set, the fourth resource set is a resource set for sending sidelink control information, and the fifth resource set is a resource set for sending an acknowledgment/negative acknowledgment ACK/NACK. The resource set for sending an acknowledgment/negative acknowledgment ACK/NACK is a resource set, on a sidelink, used for sending an acknowledgment/negative acknowledgment ACK/NACK.

Specifically, when the first device sends the first information, the resource set (for example, the third resource set) in which the resource carrying the first information is located may be a resource set, configured by the network device for the first device, specifically used to carry the first information. The third resource set may be different from a resource set (for example, the fourth resource set) used to carry sidelink control information, or the third resource set may be different from a resource set (for example, the fifth resource set) used to carry an acknowledgment/negative acknowledgment ACK/NACK, or the third resource set may be a resource set different from both the fourth resource set and the fifth resource set.

In step 210, the first device may send the first information on a resource in a third resource set, where the third resource set is a subset of a fourth resource set or is a subset of a fifth resource set, the fourth resource set is a resource set for sending sidelink control information, and the fifth resource set is a resource set for sending an acknowledgment/negative acknowledgment ACK/NACK.

Specifically, when the first device sends the first information, the third resource set in which the resource carrying the first information is located may be the subset of the fourth resource set, or the third resource set in which the resource carrying the first information is located may be a subset of the fifth resource set.

For example, the network device obtains, as the third resource set, a part of subsets from the fourth resource set, or the network device obtains, as the third resource set, a part of subsets from the fifth resource set.

It should be noted that in this embodiment of this application, the third resource set to the fifth resource set may be configured by the network device by using signaling. For example, the network device may configure the third resource set for any one of the first device, the second device, and a third device by using at least one of RRC signaling, MAC signaling, and physical layer signaling. Correspondingly, the first device, the second device, or the third device may obtain configuration information sent by the network device, and determine, based on the configuration information, the third resource set configured by the network device for the first device, the second device, or the third device. In other words, the network device may configure, for any terminal device operating on the SL, the third resource set by using at least one of RRC signaling, MAC signaling, and physical layer signaling. Correspondingly, the terminal device operating on the SL may obtain configuration information sent by the network device, and determine, based on the configuration information, the third resource set configured by the network device for the terminal device operating on the SL.

It should be noted that the fifth resource set in this application may alternatively include a resource set for sending CSI.

Optionally, the sidelink control information is further used to indicate at least one of the following information: the resource for sending the first information, a time domain position for sending the first information, and a sequence of sending first information by a plurality of devices in a first communication group. The first communication group is a groupcast communication group to which the first device belongs, and the plurality of devices include the first device.

Specifically, the sidelink control information may indicate the resource for sending the first information and/or the time domain position for sending the first information. In addition, when the first device is a device in a groupcast communication group (for example, the first communication group), the sidelink control information may further be used to indicate the sequence of sending the first information by the plurality of devices including the first device in the first communication group.

For example, the first communication group includes six devices, and each device has an identifier that can represent an order of sending the first information by the device in the first communication group. An identifier corresponding to a device that first sends the first information in the six devices may be 1. The rest can be deduced by analogy, and an identifier corresponding to a device that last sends the first information in the six devices may be 6.

If the first device is the device that first sends the first information in the first communication group, the second device may send, to the first device, the sidelink control information carrying the identifier "1" corresponding to the first device.

For another example, the first communication group includes six devices, each device has a relative identifier in the first communication group, and identifiers of the six devices in the group are sequentially 1 to 6. The second device may send the sidelink control information carrying a sending sequence sorted in ascending order of the identifiers, or carrying a sending sequence sorted in descending order of the identifiers, or carrying a preset sending sequence. If the first device is a device whose relative identifier is 3 in the first communication group, the first device may send the first information at a moment, corresponding to the identifier of the first device, in the sending sequence indicated by the second device. For example, when the sending sequence carried in the sidelink control information sent by the second device is sorted in ascending order of the identifiers, the first device sends the first information in the third sending position. When the sending sequence carried in the sidelink control information sent by the second device is sorted in descending order of the identifiers, the first device sends the first information in the fourth sending position. The sending position may be a time domain position or a frequency domain position. The sending sequence may be a time domain sequence or a frequency domain sequence.

By way of example rather than limitation, the sequence of sending the first information by the plurality of devices in the first communication group may be preconfigured, or may be configured by the network device by using signaling. For example, the network device may configure, for corresponding devices by using at least one of RRC signaling, MAC signaling, and physical layer signaling, the sequence of sending the first information by the plurality of devices in the first communication group.

In addition, there may be a correspondence between a sending sequence index value and the sequence of sending the first information by the plurality of devices. The network device may send, to the devices in the first communication group by using at least one of RRC signaling, MAC signaling, and physical layer signaling, the correspondence between the sending sequence index value and the sequence of sending the first information. When the network device has determined a sending sequence of sending the first information by the devices in the first communication group, the network device may send, to the devices in the first communication group, the sidelink control information carrying a sending sequence index value corresponding to the sending sequence of the first information, so that the devices in the first communication group determine, based on the sending sequence index value, the sending sequence that is of the first information and that corresponds to the index value, and send the respective first information in the sending sequence that is of the first information and that corresponds to the index value.

When the first device is a device in a groupcast communication group (for example, the first communication group), first resource sets indicated by different devices in the communication group may have an intersection set, or may have no intersection set. When the first resource sets have an intersection set, the second device may select, during sensing, the intersection set as a resource used for data communication, that is, the second device determines a part of resources in the intersection set as an available resource. When the first resource sets have no intersection set, the second device may select, as a resource used for data communication, a resource in an intersection set of first resource sets indicated by most devices in the groupcast communication group, that is, the second device determines, as an available resource, the resource in the intersection set of the first resource sets indicated by the most devices in the communication group. For example, there are 10 devices in the first communication group, nine devices are used as receiving devices, and one device is used as a sending device. When there is no resource intersection set among first resource sets fed back by the nine devices, if first resource sets fed back by seven devices all have a resource 1, the resource 1 that can enable all the seven devices to meet a channel sounding condition is selected as a resource used for data communication.

In addition, the sidelink control information may further indicate the resource for sending the first information. The resource may be any one or a combination of a time domain resource, a frequency domain resource, or a space domain resource, to support groupcast communication and unicast communication. When the first device is a device in a groupcast communication group (for example, the first communication group), the first device may send, in the sequence that is of sending the first information and that is indicated in the sidelink control information, the first information on the corresponding time domain resource and/or frequency domain resource indicated in the sidelink control information. In addition, when the first device is a device in the unicast communication, the first device may send, based on the resource that is for sending the first information and that is indicated in the sidelink control information, the first information on the corresponding time domain resource and/or frequency domain resource indicated in the sidelink control information.

In addition, the sidelink control information may further indicate the frequency domain resource used when the first device sends the first information. The frequency domain resource may be indicated by using an absolute identifier of the frequency domain resource, an offset of the frequency domain resource, or a combination of an absolute identifier of the frequency domain resource and an offset of the frequency domain resource. The offset of the frequency domain resource may be indicated by using a physical resource block (PRB) offset, an RE offset, a control resource set (CORSET) offset, or a control channel element (CCE) offset.

For example, when the frequency domain resource is indicated by using the offset of the frequency domain resource, the first device determines, depending on whether an available resource can be sensed on the frequency domain resource indicated by the offset of the frequency domain resource, a resource for sending the feedback information. Specifically, when no available resource that can be used to send the feedback information is sensed on a frequency domain resource indicated by using an offset of the first frequency domain resource, sensing is performed on a frequency domain resource indicated by using an offset of the second frequency domain resource. The rest can be deduced by analogy until a resource that can be used for feedback is found, and the feedback information is sent on a corresponding frequency domain resource. A representation method for the offset of the first frequency domain resource, the offset of the second frequency domain resource, . . . , and an offset of the $N^{th}$ frequency domain resource may be one of the following several methods: 1. The offset of the first frequency domain resource is a reference value, the offset of the second frequency domain resource is an offset relative to the offset of the first frequency domain resource, an offset of the third frequency domain resource is an offset relative to the offset of the first frequency domain resource, . . . , and the offset of the $N^{th}$ frequency domain resource is an offset relative to the offset of the first frequency domain resource. 2. The offset of the first frequency domain resource is a reference value, the offset of the second frequency domain resource is an offset relative to the offset of the first frequency domain resource, an offset of the third frequency domain resource is an offset relative to the offset of the second frequency domain resource, . . . , and the offset of the $N^{th}$ frequency domain resource is an offset relative to an offset of the $(N-1)^{th}$ frequency domain resource. 3. The offset of the first frequency domain resource is a reference value, there are a total quantity N of available offsets of frequency domain resources, and an offset of each frequency domain resource is an offset relative to an offset of a previous frequency domain resource (for example, an offset of any $N^{th}$ frequency domain resource is an offset relative to an offset of the $(N-1)^{th}$ frequency domain resource). 4. The offset of the first frequency domain resource may be an offset relative to a current frequency domain resource on which the sidelink control information is sent, the offset of the second frequency domain resource is an offset relative to the current frequency domain resource on which the sidelink control information is sent, . . . , and the offset of the $N^{th}$ frequency domain resource is an offset relative to the current frequency domain resource on which the sidelink control information is sent. 5. The offset of the first frequency domain resource may be an offset relative to a current frequency domain resource on which the sidelink control information is sent, the offset of the second frequency domain resource is an offset relative to the first frequency domain resource, . . . , an offset of the third frequency domain resource is an offset relative to the first frequency domain resource, and the offset of the $N^{th}$ frequency domain resource is an offset relative to the first frequency domain resource. 6. The offset of the first frequency domain resource may be an offset relative to a current frequency domain resource on which the sidelink control information is sent, the offset of the second frequency domain resource is an offset relative to the first frequency domain resource, an offset of the third frequency domain resource is an offset relative to the second frequency domain resource, . . . , and the offset of the N$^{th}$ frequency domain resource is an offset relative to the (N−1)$^{th}$ frequency domain resource. The reference value may be an offset relative to a current frequency bandwidth or a current bandwidth part (BWP) in which the sidelink control information is located or an offset relative to a current carrier, a current CCE, a current CORSET, a current PRB, or a current RE on which the sidelink control information is located; or may be an offset relative to the current frequency domain resource on which the sidelink control information is sent. All the foregoing offsets may be offsets in a unit of a CCE, a control resource set (CORSET), a PRB, or an RE.

For another example, when the frequency domain resource is indicated by using the combination of the absolute identifier of the frequency domain resource and the offset of the frequency domain resource, the offset of the first frequency domain resource may be an absolute frequency domain resource value. Details are not described again for a same implementation process.

In addition, the sidelink control information may further indicate frequency domain resources used when the plurality of devices including the first device in the first communication group send the first information. The frequency domain resources may be indicated by using absolute identifiers of the frequency domain resources, offsets of the frequency domain resources, or combinations of absolute identifiers of the frequency domain resources and offsets of the frequency domain resources.

For example, the sidelink control information may further indicate the frequency domain resources used when the plurality of devices including the first device in the first communication group send the first information. When the first communication group includes six devices, each device has a relative identifier in the first communication group, and identifiers of the six devices in the group are sequentially 1 to 6. The sidelink control information may include six frequency domain resources. The second device may send the sidelink control information explicitly carrying or implicitly indicating the sending sequence sorted in ascending order of the identifiers, or explicitly carrying or implicitly indicating the sending sequence sorted in descending order of the identifiers, or explicitly carrying or implicitly indicating the preset sending sequence. If the first device is a device whose relative identifier is 3 in the first communication group, the first device may send the first information on a frequency domain resource, corresponding to the identifier of the first device, in the sending sequence indicated by the second device. For example, when the sending sequence carried in the sidelink control information sent by the second device is sorted in ascending order of the identifiers, the first device sends the first information in the third sending position. When the sending sequence carried in the sidelink control information sent by the second device is sorted in descending order of the identifiers, the first device sends the first information on the fourth frequency domain resource.

Optionally, before the first device, the second device, and the third device perform the foregoing method, the method may further include: receiving configuration signaling from the network device, where the configuration signaling indicates at least one group of resources for sending the first information and/or the sequence of sending the first information by the plurality of devices in the communication group. Further, in this implementation, the sidelink control information is used to activate the at least one group of resources and/or the sending sequence that are/is indicated by the configuration signaling. For example, if the configuration signaling indicates five groups of resources for sending the first information, the sidelink control information may be used to activate one of the five groups of resources, or the sidelink control information indicates one of the five groups of resources, to send the first information. Optionally, the configuration signaling may be RRC signaling, MAC signaling, or physical layer signaling.

It should be further noted that the first information is one type of the feedback information in this application, and the feedback information may be one or more of the HARQ, the first information, and the CSI. The foregoing descriptions about that the sidelink control information indicates the resource for sending the first information and that the sidelink control information indicates the sequence of sending the first information are also applicable to the HARQ and the CSI. To be specific, the sidelink control information may be used to indicate a resource for sending the feedback information and a sequence of sending feedback information. For a method for indicating, by the sidelink control information, the resource for sending the feedback information and the sequence of sending the feedback information, refer to the foregoing related descriptions about that the sidelink control information indicates the resource for sending the first information and the sequence of sending the first information. For brevity, details are not described herein again.

Because the third device is within the coverage of the second device, or within coverage of the first device, or within coverage of the second device and the first device, the first information sent by the first device may be received by the third device, and the sidelink control information sent by the second device may also be received by the third device. When receiving the first information, the third device may determine whether the resource in the first resource set can be used. When receiving the sidelink control information, the third device may determine whether the resource in the second resource set can be used. When receiving the first information and the sidelink control information, the third device may determine whether a resource in a union set of the first resource set and the second resource set can be used, or the third device may determine whether a resource in an intersection set of the first resource set and the second resource set can be used. Therefore, the method 200 may further include step 240 and step 250. The following describes step 240 and step 250 in the method 200 in detail.

Step 240: The third device receives the first information in step 220 and/or the sidelink control information in step 210, where the first information includes the indication information of the first resource set, the first resource set is for receiving data, the sidelink control information includes the indication information of the second resource set, and the second resource set is for sending data.

The first resource set may be a subset of the second resource set. In this case, there may be two cases: A part of the resources in the first resource set are a subset of the second resource set; and all the resources in the first resource set are a subset of the second resource set. However, this embodiment of this application is not limited thereto. For example, when determining, after measuring the resources in the second resource set, that all the resources in the second resource set are unavailable, the first device may determine the resources in the first resource set, that is, none of the resources in the first resource set may belong to the second resource set.

Step 260: The third device determines the available resource in the first resource set, and/or the third device determines the available resource in the second resource set.

Specifically, after receiving the sidelink control information sent by the second device, the third device determines the available resource in the second resource set included in the sidelink control information. Alternatively, after receiving the first information sent by the first device, the third device determines the available resource in the first resource set included in the first information. Alternatively, after receiving the first information sent by the first device and the sidelink control information sent by the second device, the third device determines the available resource in the first resource set and the second resource set.

Optionally, the first information carries the first indication field, and information in the first indication field is used to indicate that the first resource set is for receiving data. To be specific, the information in the first indication field may indicate, to the third device, that the first information is transmitted by a device configured to receive data.

Optionally, the sidelink control information carries the second indication field, and the second indication field is used to indicate that the second resource set is for sending data. To be specific, information in the second indication field may indicate, to the third device, that the sidelink control information is transmitted by a device configured to send data. Optionally, the second indication field may implement indication by using a reserved bit in the sidelink control information, or may implement indication by using an existing defined bit in the sidelink control information. For example, the existing defined bit in the sidelink control information is used to define a modulation and demodulation scheme (for example, modulation and coding scheme, MCS) for transmitting data information, and it can be learned from the bit that the second resource set is for sending data.

For specific descriptions of the first indication field and the second indication field, refer to the foregoing related descriptions. For brevity, details are not described herein again.

Optionally, the resource set in which the resource carrying the first information is located may further be used to indicate that information received by the third device is transmitted by the device configured to receive data, and/or the resource set in which the resource carrying the sidelink control information is located may further be used to indicate that the information received by the third device is transmitted by the device configured to send data.

Specifically, when the information received by the third device is carried on the resource in the third resource set, the third resource set carrying the information may indicate that the information received by the third device is from the device that is about to receiving data. In this case, the information received by the third device is the first information.

The third resource set may be a resource set separately configured for the first information. In this case, the third resource set may be different from the fourth resource set and/or may be different from the fifth resource set. The fourth resource set may be a resource set for sending sidelink control information, and the fifth resource set may be a resource set for sending an acknowledgment/negative acknowledgment ACK/NACK.

In addition, the third resource set may be a subset of the fourth resource set, or the third resource set is a subset of the fifth resource set.

When the information received by the third device is carried on a resource in the fourth resource set, the fourth resource set carrying the information may indicate that the information received by the third device is from the device that is about to sending data. In this case, the information received by the third device is the sidelink control information.

If the information received by the third device is from the device (for example, the first device) configured to receive data, the information received by the third device is the first information, and the third device may determine the available resource in the first resource set based on a first threshold. If the information received by the third device is from the device (for example, the second device) configured to send data, the information received by the third device is the sidelink control information, and the third device may determine the available resource in the second resource set based on a second threshold. If the third device receives both the first information sent by the first device and the sidelink control information sent by the second device, the third device may determine the available resource in the first resource set based on a first threshold, and determine the available resource in the second resource set based on a second threshold. The second threshold is greater than the first threshold.

The first threshold and/or the second threshold are/is preset, or the first threshold and/or the second threshold are/is determined based on a service priority of the second device and a service priority of the third device.

The following describes a method for determining, by the third device, the available resource in the first resource set and/or the available resource in the second resource set.

Optionally, the determining the available resource in the first resource set includes: determining a resource on which a received signal whose signal strength is less than or equal to the first threshold in the first resource set as the available resource; or when signal strength of the first information is less than or equal to the first threshold, determining the resource in the first resource set as the available resource.

Specifically, if the third device determines that the received information is transmitted by the device configured to receive data, the information received by the third device is the first information. The third device may compare, with the first threshold, signal strength of a received signal on the resource in the first resource set included in the first information; and determine, through comparison, the resource on which the received signal whose signal strength is less than or equal to the first threshold in the first resource set as the available resource.

In addition, the third device may determine, through comparison, a resource on which a received signal whose signal strength is greater than or equal to the first threshold in the first resource set as an unavailable resource.

For example, the first threshold may be −80 dB, and the third device may determine a resource on which a received signal whose signal strength is less than or equal to −80 dB in the first resource set as the available resource; and determine a resource on which a received signal whose signal strength is greater than or equal to −80 dB in the first resource set as the unavailable resource.

For another example, the first threshold may be −60 dB, and the third device may determine a resource on which a received signal whose signal strength is less than or equal to −60 dB in the first resource set as the available resource; and determine a resource on which a received signal whose signal strength is greater than or equal to −60 dB in the first resource set as the unavailable resource.

When determining whether the resource in the first resource set is available, the third device may further compare the signal strength of the first information with the first threshold. If the signal strength of the first information is less than or equal to the first threshold, the third device determines the resource in the first resource set as the available resource through comparison.

In addition, if the signal strength of the first information is greater than or equal to the first threshold, the third device determines the resource in the first resource set as the unavailable resource through comparison. Optionally, the third device determines all the resources in the first resource set as unavailable resources.

For example, the first threshold may be −70 dB. If the signal strength of the first information is less than or equal to −70 dB, the third device determines the resource in the first resource set as the available resource. If the signal strength of the first information is greater than or equal to −70 dB, the third device determines the resource in the first resource set as the unavailable resource. Optionally, the first threshold is −70 dB. If the signal strength of the first information is less than or equal to −70 dB, the third device determines all the resources in the first resource set as available resources. If the signal strength of the first information is greater than or equal to −70 dB, the third device determines all the resources in the first resource set as the unavailable resources.

It should be noted that the first threshold may be preset, or the first threshold may be determined based on a service priority of the first device and the service priority of the third device, or the first threshold may be configured by the network device by using at least one of RRC signaling, MAC signaling, and physical layer signaling. The configuration may be at a granularity of a cell, to be specific, a same first threshold is configured for terminal devices in a same cell. Alternatively, the configuration may be at a granularity of a terminal device, to be specific, the network device may separately configure a first threshold for a terminal device by using the foregoing signaling. When the configuration is at the granularity of the cell, the first threshold may be sent by the network device by using a broadcast message. When the configuration is at the granularity of the terminal device, the first threshold may be sent by the network device by using terminal-device-specific RRC signaling. This is not particularly limited in this embodiment of this application.

Optionally, the determining the available resource in the second resource set includes: determining a resource on which a received signal whose signal strength is less than or equal to the second threshold in the second resource set as the available resource; or when signal strength of the sidelink control information is less than or equal to the second threshold, determining the resource in the second resource set as the available resource.

Specifically, if the third device determines that the received information is transmitted by the device configured to send data, the information received by the third device is the sidelink control information. The third device may compare, with the second threshold, signal strength of a received signal on the resource in the second resource set included in the sidelink control information; and determine, through comparison, the resource on which the received signal whose signal strength is less than or equal to the second threshold in the second resource set as the available resource.

In addition, the third device may determine, through comparison, a resource on which a received signal whose signal strength is greater than or equal to the second threshold in the second resource set as an unavailable resource.

For example, the second threshold may be −40 dB, and the third device may determine a resource on which a received signal whose signal strength is less than or equal to −40 dB in the second resource set as the available resource; and determine a resource on which a received signal strength is greater than or equal to −40 dB in the second resource set as the unavailable resource.

For another example, the second threshold may be −20 dB, and the third device may determine a resource on which a received signal whose signal strength is less than or equal to −20 dB in the second resource set as the available resource; and determine a resource on which a received signal whose signal strength is greater than or equal to −20 dB in the second resource set as the unavailable resource.

When determining whether the resource in the second resource set is available, the third device may further compare the signal strength of the sidelink control information with the second threshold. If the signal strength of the sidelink control information is less than or equal to the second threshold, the third device determines the resource in the second resource set as the available resource through comparison.

In addition, if the signal strength of the sidelink control information is greater than or equal to the second threshold, the third device determines the resource in the second resource set as the unavailable resource through comparison. Optionally, if the signal strength of the sidelink control information is greater than or equal to the second threshold, the third device determines all the resources in the second resource set as unavailable resources.

For example, the second threshold may be −30 dB. If the signal strength of the sidelink control information is less than or equal to −30 dB, the third device determines the resource in the second resource set as the available resource. If the signal strength of the sidelink control information is greater than or equal to −30 dB, the third device determines the resource in the second resource set as the unavailable resource. Optionally, the second threshold is −30 dB. If the signal strength of the sidelink control information is less than or equal to −30 dB, the third device determines all the resources in the second resource set as available resources. If the signal strength of the sidelink control information is greater than or equal to −30 dB, the third device determines all the resources in the second resource set as the unavailable resources.

It should be noted that the second threshold may be preset, or the second threshold may be determined based on the service priority of the second device and the service priority of the third device, or the second threshold may be configured by the network device by using at least one of RRC signaling, MAC signaling, and physical layer signaling. The configuration may be at a granularity of a cell, to be specific, a same second threshold is configured for terminal devices in a same cell. Alternatively, the configuration may be at a granularity of a terminal device, to be specific, the network device may separately configure a second threshold for a terminal device by using the foregoing signaling. When the configuration is at the granularity of the cell, the second threshold may be sent by the network device by using a broadcast message. When the configuration is at the granularity of the terminal device, the second threshold may be sent by the network device by using terminal-device-specific RRC signaling. This is not particularly limited in this embodiment of this application.

It should be further noted that in this embodiment of this application, the third device may receive both the first information and the sidelink control information. In this case, the third device needs to determine whether the resource in the first resource set is available, and further needs to determine whether the resource in the second resource set is available. For a method for determining, by the third device, whether the resource in the first resource set is available and whether the resource in the second resource set is available, refer to the foregoing related descriptions. For brevity, details are not described herein again.

It should be noted that, when the first resource set and the second resource set include a same resource, the third device may compare signal strength of a received signal on the resource with the first threshold when determining whether the resource is available, and determine, based on a comparison result, whether the resource is available.

In this embodiment of this application, after determining a resource to be used by the second device to send data, the first device may further receive, on the determined resource, the data sent by the second device, and may further send data feedback information to the second device depending on whether the data is successfully received.

For example, when successfully receiving the data sent by the second device, the first device may send an ACK to the second device. When failing to receive the data sent by the second device, the first device may send a NACK to the second device.

In addition, the sidelink control information may further be used to indicate at least one of the following information: a resource for sending the data feedback information, a time domain position for sending the data feedback information, and a sequence of sending data feedback information by a plurality of devices in a second communication group. The second communication group is a groupcast communication group to which the first device belongs, and the plurality of devices include the first device.

Specifically, the sidelink control information may indicate the resource for sending the data feedback information and/or the time domain position for sending the data feedback information. In addition, when the first device is a device in a groupcast communication group (for example, the second communication group), the sidelink control information may further be used to indicate the sequence of sending the data feedback information by the plurality of devices in the second communication group.

For example, the second communication group includes four devices, and each device has an identifier that can represent an order of sending the data feedback information by the device in the second communication group. An identifier corresponding to a device that first sends the data feedback information in the four devices may be 1. The rest can be deduced by analogy, and an identifier corresponding to a device that last sends the data feedback information in the four devices may be 4.

If the first device is the device that last sends the data feedback information in the second communication group, the second device may send, to the first device, the sidelink control information carrying the identifier "4" corresponding to the first device.

By way of example rather than limitation, the sequence of sending the data feedback information by the plurality of devices in the second communication group may be preconfigured, or may be configured by the network device by using signaling. For example, the network device may configure, for corresponding devices by using at least one of RRC signaling, MAC signaling, and physical layer signaling, the sequence of sending the data feedback information by the plurality of devices in the second communication group.

In addition, there may be a correspondence between a sending sequence index value and the sequence of sending the data feedback information by the plurality of devices. The network device may send, to the devices in the second communication group by using at least one of RRC signaling, MAC signaling, and physical layer signaling, the correspondence between the sending sequence index value and the sequence of sending the data feedback information. When the network device has determined a sending sequence of sending the data feedback information by the devices in the second communication group, the network device may send, to the devices in the second communication group, the sidelink control information carrying a sending sequence index value corresponding to the sending sequence of the data feedback information, so that the devices in the second communication group determine, based on the sending sequence index value, the sending sequence that is of the data feedback information and that corresponds to the index value, and send the respective data feedback information in the sending sequence that is of the data feedback information and that corresponds to the index value.

It should be noted that a resource pool or a resource group may be replaced with the resource set in this application. This is not specifically limited in this application.

It should be further noted that, for the second device, this application may alternatively include the following cases in addition to the case, shown in FIG. 3, in which the second device receives the first information from the first device after sending the sidelink control information and then performs data communication:

The second device receives the CSI information from the first device after sending the sidelink control information, and then performs data communication.

Alternatively, the second device receives the CSI information from the first device after sending the sidelink control information, then performs data communication, and receives, from the first device, an SL HARQ included on the PSFCH.

Alternatively, after sending the sidelink control information, the second device performs data communication, and receives, from the first device, an SL HARQ included on the PSFCH.

Alternatively, the second device receives the first information from the first device after sending the sidelink control information, then performs data communication, and receives, from the first device, an SL HARQ included on the PSFCH.

Alternatively, the second device receives the first information and the CSI information from the first device after sending the sidelink control information, then performs data communication, and receives, from the first device, an SL HARQ included on the PSFCH.

The foregoing descriptions are merely examples, and do not constitute any special limitation on this application.

It should be further noted that, for the foregoing information included in the sidelink control information in this application, in actual communication, the sidelink control information may include only any one of the foregoing information. For example, the sidelink control information sent by the second device may include only the indication field used to indicate whether to send the feedback information. Alternatively, the sidelink control information sent by the second device may indicate only the resource for sending the feedback information. Alternatively, the sidelink control information sent by the second device may indicate only the sequence of sending the feedback information. Alternatively, the sidelink control information sent by the second device may include only the indication information of the second resource set. Alternatively, the sidelink control information sent by the second device may include any two of the foregoing information. For example, the sidelink control information sent by the second device includes the indication information of the second resource set and the second indication field. Alternatively, the sidelink control information sent by the second device may include a plurality of the foregoing information. For example, the sidelink control information sent by the second device includes the indication field used to indicate whether to send the feedback information, and the indication information of the second resource set and the second indication field. This is not particularly limited in this application.

It should be further noted that the time domain resource in this application may be in a unit of a subframe, a slot, a mini slot, or a symbol, and the frequency domain resource in this application may be in a unit of a PRB, an RE, a subchannel, a CCE, or a CORSET. One subchannel may include one or more PRBs, and a plurality of PRBs may be continuously or discontinuously distributed.

It should be further noted that, in this application, the foregoing signal strength may include any one of reference signal received quality (RSRP), reference signal received power (RSRQ), a received signal strength indication (RSSI), and a signal to interference plus noise ratio (SINR). On the SL, the RSRP, the RSRQ, the RSSI, and the SINR may also be referred to as SL-RSRP, SL-RSRQ, an SL-RSSI, or an SL-SINR. The signal strength may alternatively be replaced with a detected energy magnitude. The foregoing describes, in detail with reference to FIG. 1 to FIG. 3, the transmission resource determining method provided in the embodiments of this application. The following describes, in detail with reference to FIG. 4 to FIG. 9, communications apparatuses provided in the embodiments of this application.

Figure 4:
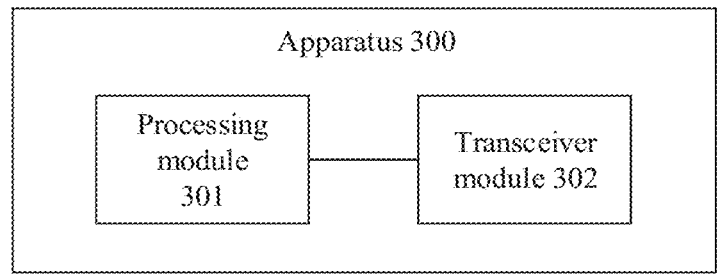
FIG. 4 is a schematic block diagram of a transmission resource determining apparatus according to an embodiment of this application.

FIG. 4 is a schematic block diagram of a transmission resource determining apparatus 300 according to an embodiment of this application. The apparatus 300 is configured to perform the method performed by the second device in the foregoing method embodiment. Optionally, a specific form of the apparatus 300 may be a chip in the second device. This is not limited in this embodiment of this application. The apparatus 300 includes:

a processing module 301, configured to determine sidelink control information, where the sidelink control information includes indication information of a second resource set and a second indication field, and the second indication field is used to indicate that the second resource set is for sending data; and a transceiver module 302, configured to send the sidelink control information.

Optionally, the sidelink control information includes at least one of the following: a resource for sending first information, a time domain position for sending the first information, and a sequence of sending first information by a plurality of devices in a first communication group. The first communication group is a groupcast communication group to which a first device belongs, and the plurality of devices include the first device.

Optionally, the sidelink control information includes second information, and the second information is used to indicate to send the first information.

It should be understood that the transmission resource determining apparatus 300 in this embodiment of this application may correspond to the second device in the embodiment of the method 200 in the embodiments of this application, and the apparatus 300 may include modules configured to perform the method performed by the second device in the embodiment of the method 200 in FIG. 3. In addition, the foregoing and other operations and/or functions of the modules in the apparatus 300 are separately used to implement corresponding steps performed by the second device in the embodiment of the method 200 in FIG. 3. Therefore, beneficial effects in the foregoing method embodiment can also be implemented. For brevity, details are not described herein again.

It should be further understood that the modules in the apparatus 300 may be implemented in a form of software and/or hardware. This is not specifically limited. In other words, the apparatus 300 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 300 may be in a form shown in FIG. 5. The processing module 301 may be implemented by a processor 401 and a memory 402 shown in FIG. 5. The transceiver module 302 may be implemented by a transceiver 403 shown in FIG. 5. Specifically, the processor executes a computer program stored in the memory to implement the method. Optionally, when the apparatus 300 is a chip, a function and/or an implementation process of the transceiver module 302 may alternatively be implemented by a pin, a circuit, or the like. Optionally, the memory is a storage unit, for example, a register or a cache, in the chip. The storage unit may alternatively be a storage unit, such as the memory 402 shown in FIG. 5, that is in the computer device and that is located outside the chip.

Figure 5:
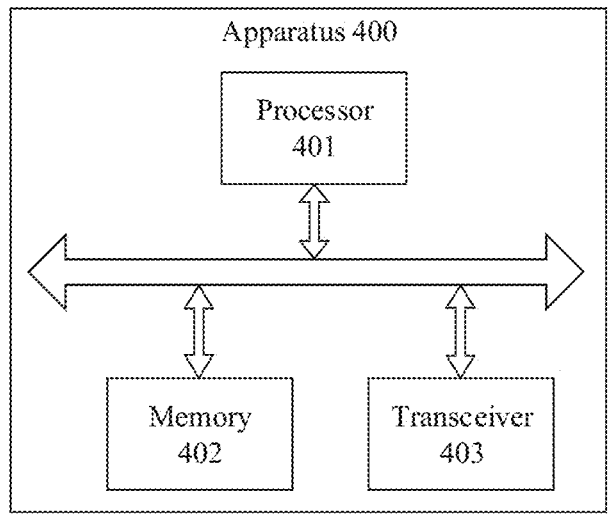
FIG. 5 is a schematic structural diagram of a transmission resource determining apparatus according to an embodiment of this application.

FIG. 5 is a schematic structural diagram of a transmission resource determining apparatus 400 according to an embodiment of this application. As shown in FIG. 5, the apparatus 400 includes a processor 401.

In a possible implementation, the processor 401 is configured to: determine sidelink control information, where the sidelink control information includes indication information of a second resource set and a second indication field, and the second indication field is used to indicate that the second resource set is for sending data.

The processor 401 is further configured to invoke an interface to perform the following action: sending the sidelink control information.

Optionally, the sidelink control information includes at least one of the following: a resource for sending first information, a time domain position for sending the first information, and a sequence of sending first information by a plurality of devices in a first communication group. The first communication group is a groupcast communication group to which the first device belongs, and the plurality of devices include the first device.

Optionally, the sidelink control information includes second information, and the second information is used to indicate to send the first information.

It should be understood that the processor 401 may invoke the interface to perform the foregoing sending action. The invoked interface may be a logical interface or a physical interface. This is not limited in this embodiment of this application. Optionally, the physical interface may be implemented by a transceiver. Optionally, the apparatus 400 may further include a transceiver 403.

Optionally, the apparatus 400 further includes a memory 402, and the memory 402 may store program code in the foregoing method embodiment, so that the processor 401 invokes the program code.

Specifically, if the apparatus 400 includes the processor 401, the memory 402, and the transceiver 403, the processor 401, the memory 402, and the transceiver 403 communicate with each other through an inner connection path, to transmit a control signal and/or a data signal. In a possible design, the processor 401, the memory 402, and the transceiver 403 may be implemented by a chip. The processor 401, the memory 402, and the transceiver 403 may be implemented in a same chip, or may be separately implemented in different chips, or functions of any two of the processor 401, the memory 402, and the transceiver 403 are implemented in one chip. The memory 402 may store the program code, and the processor 401 invokes the program code stored in the memory 402, to implement a corresponding function of the apparatus 400.

It should be understood that the apparatus 400 may further be configured to perform other steps and/or operations on a second device side in the foregoing embodiment. For brevity, details are not described herein again.

Figure 6:
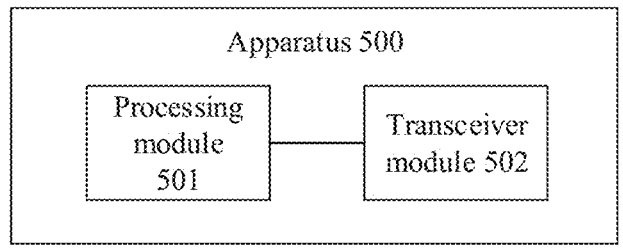
FIG. 6 is another schematic block diagram of a transmission resource determining apparatus according to an embodiment of this application.

FIG. 6 is a schematic block diagram of a transmission resource determining apparatus 500 according to an embodiment of this application. The apparatus 500 is configured to perform the method performed by the first device in the foregoing method embodiment. Optionally, a specific form of the apparatus 500 may be a chip in the first device. This is not limited in this embodiment of this application. The apparatus 500 includes:
- a processing module 501, configured to determine first information, where the first information includes indication information of a first resource set and a first indication field, and the first indication field is used to indicate that the first resource set is for receiving data; and
- a transceiver module 502, configured to send the first information.

Optionally, the first indication field is a format field in the first information, and a value of the format field in the first information is different from a value of a format field in sidelink control information.

Optionally, the transceiver module 502 is further configured to: before sending the first information, receive sidelink control information sent by a second device, where the sidelink control information includes indication information of a second resource set and a second indication field, the second indication field is used to indicate that the second resource set is for sending data, and the first resource set is a subset of the second resource set.

Optionally, the sidelink control information includes the second indication field, and the second indication field is used to indicate that the second resource set is for sending data.

Optionally, the transceiver module 502 is further configured to send the first information on a resource in a third resource set, where the third resource set is different from a fourth resource set and/or is different from a fifth resource set, the fourth resource set is a resource set for sending sidelink control information, and the fifth resource set is a resource set for sending an acknowledgment/negative acknowledgment ACK/NACK.

Optionally, the transceiver module 502 is further configured to send the first information on a resource in a third resource set, where the third resource set is a subset of a fourth resource set or is a subset of a fifth resource set, the fourth resource set is a resource set for sending sidelink control information, and the fifth resource set is a resource set for sending an acknowledgment/negative acknowledgment ACK/NACK.

Optionally, the sidelink control information includes at least one of the following: the resource for sending the first information, a time domain position for sending the first information, and a sequence of sending first information by a plurality of devices in a first communication group. The first communication group is a groupcast communication group to which the first device belongs, and the plurality of devices include the first device.

Optionally, the transceiver module 502 is further configured to: before sending the first information, receive the sidelink control information sent by the second device, where the sidelink control information includes second information, and the second information is used to indicate to send the first information; or receive third information sent by a network device, where the third information is used to indicate to send the first information.

It should be understood that the transmission resource determining apparatus 500 in this embodiment of this application may correspond to the first device in the embodiment of the method 200 in the embodiments of this application, and the apparatus 500 may include modules configured to perform the method performed by the first device in the embodiment of the method 200 in FIG. 3. In addition, the foregoing and other operations and/or functions of the modules in the apparatus 300 are separately used to implement corresponding steps performed by the first device in the embodiment of the method 200 in FIG. 3. Therefore, beneficial effects in the foregoing method embodiment can also be implemented. For brevity, details are not described herein again.

It should be further understood that the modules in the apparatus 500 may be implemented in a form of software and/or hardware. This is not specifically limited. In other words, the apparatus 500 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 500 may be in a form shown in FIG. 7. The processing module 501 may be implemented by a processor 601 and a memory 602 shown in FIG. 7. The transceiver module 502 may be implemented by a transceiver 603 shown in FIG. 7. Specifically, the processor executes a computer program stored in the memory to implement the method performed by the first device in the embodiment of the method 200. Optionally, when the apparatus 500 is a chip, a function and/or an implementation process of the transceiver module 502 may alternatively be implemented by a pin, a circuit, or the like. Optionally, the memory is a storage unit, for example, a register or a cache, in the chip. The storage unit may alternatively be a storage unit, such as the memory 602 shown in FIG. 7, that is in the computer device and that is located outside the chip.

Figure 7:
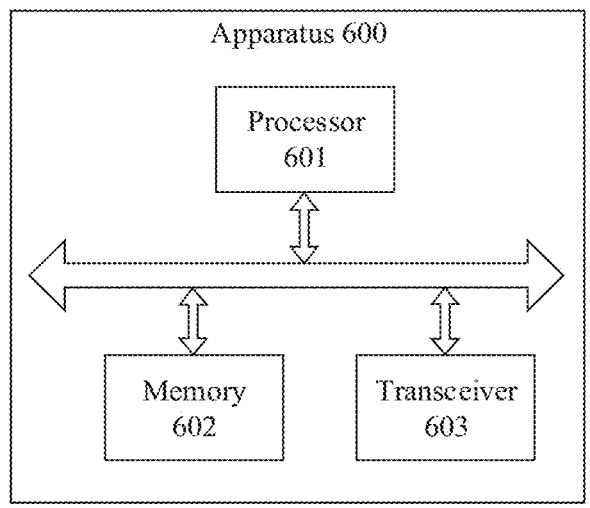
FIG. 7 is another schematic structural diagram of a transmission resource determining apparatus according to an embodiment of this application.

FIG. 7 is a schematic structural diagram of a transmission resource determining apparatus 600 according to an embodiment of this application. As shown in FIG. 7, the apparatus 600 includes a processor 601.

In a possible implementation, the processor 601 is configured to determine first information, where the first information includes indication information of a first resource set and a first indication field, and the first indication field is used to indicate that the first resource set is for receiving data.

The processor 601 is further configured to invoke an interface to perform the following action: sending the first information.

Optionally, the first indication field is a format field in the first information, and a value of the format field in the first information is different from a value of a format field in sidelink control information.

Optionally, the processor 601 is further configured to invoke the interface to perform the following action: before sending the first information, receiving sidelink control information sent by a second device, where the sidelink control information includes indication information of a second resource set and a second indication field, the second indication field is used to indicate that the second resource set is for sending data, and the first resource set is a subset of the second resource set.

Optionally, the sidelink control information includes the second indication field, and the second indication field is used to indicate the second resource set is for sending data.

Optionally, the processor 601 is further configured to invoke the interface to perform the following action: sending the first information on a resource in a third resource set, where the third resource set is different from a fourth resource set and/or is different from a fifth resource set, the fourth resource set is a resource set for sending sidelink control information, and the fifth resource set is a resource set for sending an acknowledgment/negative acknowledgment ACK/NACK.

Optionally, the processor 601 is further configured to invoke the interface to perform the following action: sending the first information on a resource in a third resource set, where the third resource set is a subset of a fourth resource set or is a subset of a fifth resource set, the fourth resource set is a resource set for sending sidelink control information, and the fifth resource set is a resource set for sending an acknowledgment/negative acknowledgment ACK/NACK.

Optionally, the sidelink control information includes at least one of the following: the resource for sending the first information, a time domain position for sending the first information, and a sequence of sending first information by a plurality of devices in a first communication group. The first communication group is a groupcast communication group to which the first device belongs, and the plurality of devices include the first device.

Optionally, the processor 601 is further configured to invoke the interface to perform the following action: before sending the first information, receive the sidelink control information sent by the second device, where the sidelink control information includes second information, and the second information is used to indicate to send the first information; or receive third information sent by a network device, where the third information is used to indicate to send the first information.

It should be understood that the processor 601 may invoke the interface to perform the foregoing sending action. The invoked interface may be a logical interface or a physical interface. This is not limited in this embodiment of this application. Optionally, the physical interface may be implemented by a transceiver. Optionally, the apparatus 600 may further include a transceiver 603.

Optionally, the apparatus 600 further includes a memory 602, and the memory 602 may store program code in the foregoing method embodiment, so that the processor 601 invokes the program code.

Specifically, if the apparatus 600 includes the processor 601, the memory 602, and the transceiver 603, the processor 601, the memory 602, and the transceiver 603 communicate with each other through an inner connection path, to transmit a control signal and/or a data signal. In a possible design, the processor 601, the memory 602, and the transceiver 603 may be implemented by a chip. The processor 601, the memory 602, and the transceiver 603 may be implemented in a same chip, or may be separately implemented in different chips, or functions of any two of the processor 601, the memory 602, and the transceiver 603 are implemented in one chip. The memory 602 may store the program code, and the processor 601 invokes the program code stored in the memory 602, to implement a corresponding function of the apparatus 600.

It should be understood that the apparatus 600 may further be configured to perform other steps and/or operations on a first device side in the foregoing embodiment. For brevity, details are not described herein again.

Figure 8:
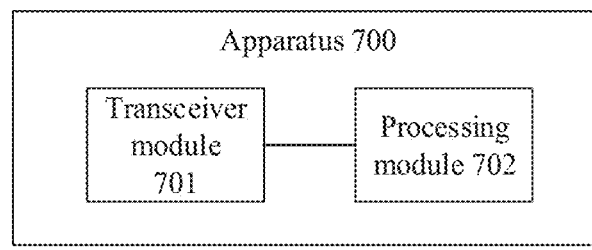
FIG. 8 is still another schematic block diagram of a transmission resource determining apparatus according to an embodiment of this application.

FIG. 8 is a schematic block diagram of a transmission resource determining apparatus 700 according to an embodiment of this application. The apparatus 700 is configured to perform the method performed by the third device in the foregoing method embodiment. Optionally, a specific form of the apparatus 700 may be a chip in the third device. This is not limited in this embodiment of this application. The apparatus 700 includes:

- a transceiver module 701, configured to receive first information and/or sidelink control information, where the first information includes indication information of a first resource set, the first resource set is for receiving data, the sidelink control information includes indication information of a second resource set, the second resource set is for sending data, and the first resource set is a subset of the second resource set; and
- a processing module 702, configured to determine an available resource in the first resource set; and/or determine an available resource in the second resource set.

Optionally, the processing module 702 is further configured to: determine a resource on which a received signal whose signal strength is less than or equal to a first threshold in the first resource set as the available resource; or when signal strength of the first information is less than or equal to the first threshold, determine a resource in the first resource set as the available resource.

Optionally, the processing module 702 is further configured to: determine a resource on which a received signal whose signal strength is greater than or equal to the first threshold in the first resource set as an unavailable resource; or when the signal strength of the first information is greater than or equal to the first threshold, determine the resource in the first resource set as an unavailable resource.

Optionally, the processing module 702 is further configured to: determine a resource on which a received signal whose signal strength is less than or equal to a second threshold in the second resource set as the available resource; or when signal strength of the sidelink control information is less than or equal to a second threshold, determine a resource in the second resource set as the available resource.

Optionally, the processing module 702 is further configured to: determine a resource on which a received signal whose signal strength is greater than or equal to the second threshold in the second resource set as an unavailable resource; or when the signal strength of the sidelink control information is greater than or equal to the second threshold, determine the resource in the second resource set as an unavailable resource.

Optionally, the first threshold and/or the second threshold are/is preset, or the first threshold and/or the second threshold are/is determined based on a service priority of a second device and a service priority of the third device.

Optionally, the first information carries a first indication field, and information in the first indication field is used to indicate that the first resource set is for receiving data.

Optionally, the first indication field is a format field in the first information, and a value of the format field in the first information is different from a value of a format field in the sidelink control information.

Optionally, the sidelink control information carries a second indication field, and the second indication field is used to indicate that the second resource set is for sending data.

Optionally, the processing module 702 is further configured to invoke an interface to perform the following action: receiving the first information on a resource in a third resource set, where the third resource set is different from a fourth resource set and/or is different from a fifth resource set, the fourth resource set is a resource set for sending sidelink control information, and the fifth resource set is a resource set for sending an acknowledgment/negative acknowledgment ACK/NACK.

Optionally, the processing module 702 is further configured to invoke an interface to perform the following action: receiving the first information on a resource in a third resource set, where the third resource set is a subset of a fourth resource set or is a subset of a fifth resource set, the fourth resource set is a resource set for sending sidelink control information, and the fifth resource set is a resource set for sending an acknowledgment/negative acknowledgment ACK/NACK.

It should be understood that the transmission resource determining apparatus 700 in this embodiment of this application may correspond to the third device in the embodiment of the method 200 in the embodiments of this application, and the apparatus 700 may include modules configured to perform the method performed by the third device in the embodiment of the method 200 in FIG. 3. In addition, the foregoing and other operations and/or functions of the modules in the apparatus 700 are separately used to implement corresponding steps performed by the third device in the embodiment of the method 200 in FIG. 3. Therefore, beneficial effects in the foregoing method embodiment can also be implemented. For brevity, details are not described herein again.

It should be further understood that the modules in the apparatus 700 may be implemented in a form of software and/or hardware. This is not specifically limited. In other words, the apparatus 700 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 700 may be in a form shown in FIG. 9. The processing module 701 may be implemented by a processor 801 and a memory 802 shown in FIG. 9. The transceiver module 702 may be implemented by a transceiver 803 shown in FIG. 9. Specifically, the processor executes a computer program stored in the memory to implement the method performed by the third device in the embodiment of the method 200. Optionally, when the apparatus 700 is a chip, a function and/or an implementation process of the transceiver module 702 may alternatively be implemented by a pin, a circuit, or the like. Optionally, the memory is a storage unit, for example, a register or a cache, in the chip. The storage unit may alternatively be a storage unit, such as the memory 802 shown in FIG. 9, that is in the computer device and that is located outside the chip.

Figure 9:
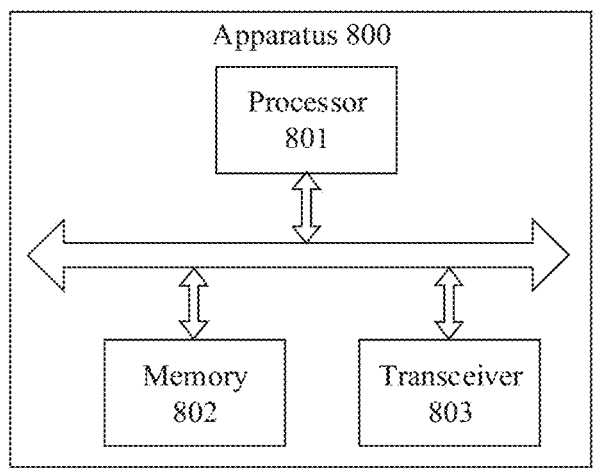
FIG. 9 is still another schematic structural diagram of a transmission resource determining apparatus according to an embodiment of this application.

FIG. 9 is a schematic structural diagram of a transmission resource determining apparatus 800 according to an embodiment of this application. As shown in FIG. 9, the apparatus 800 includes a processor 801.

In a possible implementation, the processor 801 is configured to invoke an interface to perform the following step: receiving first information and/or sidelink control information, where the first information includes indication information of a first resource set, the first resource set is for receiving data, the sidelink control information includes indication information of a second resource set, the second resource set is for sending data, and the first resource set is a subset of the second resource set.

The processor 801 is further configured to determine an available resource in the first resource set; and/or determine an available resource in the second resource set.

Optionally, the processor 801 is further configured to: determine a resource on which a received signal whose signal strength is less than or equal to a first threshold in the first resource set as the available resource; or when signal strength of the first information is less than or equal to the first threshold, determine a resource in the first resource set as the available resource.

Optionally, the processor 801 is further configured to: determine a resource on which a received signal whose signal strength is greater than or equal to the first threshold in the first resource set as an unavailable resource; or when the signal strength of the first information is greater than or equal to the first threshold, determine the resource in the first resource set as an unavailable resource.

Optionally, the processor 801 is further configured to: determine a resource on which a received signal whose signal strength is less than or equal to a second threshold in the second resource set as the available resource; or when signal strength of the sidelink control information is less than or equal to a second threshold, determine a resource in the second resource set as the available resource.

Optionally, the processor 801 is further configured to: determine a resource on which a received signal whose signal strength is greater than or equal to the second threshold in the second resource set as an unavailable resource; or when the signal strength of the sidelink control information is greater than or equal to the second threshold, determine the resource in the second resource set as an unavailable resource.

Optionally, the first threshold and/or the second threshold are/is preset, or the first threshold and/or the second threshold are/is determined based on a service priority of a second device and a service priority of a third device.

Optionally, the first information carries a first indication field, and information in the first indication field is used to indicate that the first resource set is for receiving data.

Optionally, the first indication field is a format field in the first information, and a value of the format field in the first information is different from a value of a format field in the sidelink control information.

Optionally, the sidelink control information carries a second indication field, and the second indication field is used to indicate that the second resource set is for sending data.

Optionally, the processor 801 is further configured to invoke the interface to perform the following action: receiving the first information on a resource in a third resource set, where the third resource set is different from a fourth resource set and/or is different from a fifth resource set, the fourth resource set is a resource set for sending sidelink control information, and the fifth resource set is a resource set for sending an acknowledgment/negative acknowledgment ACK/NACK.

Optionally, the processor 801 is further configured to invoke the interface to perform the following action: receiving the first information on a resource in a third resource set, where the third resource set is a subset of a fourth resource set or is a subset of a fifth resource set, the fourth resource set is a resource set for sending sidelink control information, and the fifth resource set is a resource set for sending an acknowledgment/negative acknowledgment ACK/NACK.

It should be understood that the processor 801 may invoke the interface to perform the foregoing sending action. The invoked interface may be a logical interface or a physical interface. This is not limited in this embodiment of this application. Optionally, the physical interface may be implemented by a transceiver. Optionally, the apparatus 800 may further include a transceiver 803.

Optionally, the apparatus 800 further includes a memory 802, and the memory 802 may store program code in the foregoing method embodiment, so that the processor 801 invokes the program code.

Specifically, if the apparatus 800 includes the processor 801, the memory 802, and the transceiver 803, the processor 801, the memory 802, and the transceiver 803 communicate with each other through an inner connection path, to transmit a control signal and/or a data signal. In a possible design, the processor 801, the memory 802, and the transceiver 803 may be implemented by a chip. The processor 801, the memory 802, and the transceiver 803 may be implemented in a same chip, or may be separately implemented in different chips, or functions of any two of the processor 801, the memory 802, and the transceiver 803 are implemented in one chip. The memory 802 may store the program code, and the processor 801 invokes the program code stored in the memory 802, to implement a corresponding function of the apparatus 800.

It should be understood that the apparatus 800 may further be configured to perform other steps and/or operations on a third device side in the foregoing embodiment. For brevity, details are not described herein again. It should be understood that the processor may be a general purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing circuit (for example, digital signal processor, DSP), a micro controller unit (MCU), a programmable controller (PLD), or another integrated chip. The processor may implement or perform the methods, steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It should further be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these memories and any memory of another proper type.

It should be noted that when the processor is a general purpose processor, a DSP, an ASIC, an FPGA or another programmable logic device, a discrete gate or a transistor logic device, or a discrete hardware component, the memory (storage module) is integrated into the processor.

It should be noted that the memory described in this specification includes but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:
   receiving, by a second device, configuration information from a network device, wherein the configuration information comprises an indication field, the indication field is not 0, and the indication field not being 0 indicates that the second device will send feedback information or that the second device will receive feedback information;
   determining, by the second device, sidelink control information, wherein the sidelink control information comprises indication information of a second resource set, and the second resource set is for sending data;
   sending, by the second device, the sidelink control information to a first device, and sending first data on a resource of the second resource set to the first device;
   receiving, by the second device, first information from the first device, wherein the first information comprises indication information of a first resource set, the first resource set is a part of the second resource set, and the first resource set is for receiving data; and
   receiving, by the second device, feedback information for the first data from the first device, wherein a frequency domain resource on which the feedback information for the first data is received from the first device corresponds to an identifier of the first device.

2. The method according to claim 1, wherein a correspondence between the frequency domain resource on which the feedback information for the first data is received and the identifier of the first device is preconfigured.

3. The method according to claim 1, wherein the sidelink control information further comprises trigger information, and the trigger information indicates whether the first device needs to send the feedback information for the first data.

4. The method according to claim 1, wherein the feedback information for the first data is a hybrid automatic repeat request (HARQ).

5. A communication method comprising:
   receiving, by a first device, configuration information from a network device, wherein the configuration information comprises an indication field, the indication field is not 0, and the indication field not being 0 indicates that the first device will send feedback information;
   receiving, by the first device, sidelink control information from a second device, wherein the sidelink control information comprises indication information of a second resource set;
   sending, by the first device, first information to the second device, wherein the first information comprises indication information of a first resource set, the first resource set is a part of the second resource set, and the first resource set is for receiving data;
   receiving, by the first device, first data on a resource of the second resource set from the second device; and
   sending, by the first device, feedback information for the first data to the second device, wherein a frequency domain resource used to send the feedback information for the first data corresponds to an identifier of the first device.

6. The method according to claim 5, wherein a correspondence between the frequency domain resource used to send the feedback information for the first data and the identifier of the first device is preconfigured.

7. The method according to claim 5, wherein the sidelink control information further comprises trigger information, and the trigger information indicates whether the first device will send the feedback information for the first data.

8. The method according to claim 5, wherein the feedback information for the first data is hybrid automatic repeat request (HARQ) information.

9. An apparatus, comprising:
   a memory storage comprising instructions; and
   one or more processors in communication with the memory storage, wherein execution of the instructions by the one or more processors causes the apparatus to:
   receive configuration information from a network device, wherein the configuration information comprises an indication field, the indication field is not 0, and the indication field not being 0 indicates that the apparatus will send feedback information or that the apparatus will receive feedback information;
   determine sidelink control information, wherein the sidelink control information comprises indication information of a second resource set, and the second resource set is for sending data;
   send the sidelink control information to a first device, and send first data on a resource of the second resource set to the first device, wherein the sidelink control information further comprises information of a frequency domain resource on which the first device is to send feedback information for the first data to the apparatus, the frequency domain resource corresponding to an identifier of the first device;

receive first information from the first device, wherein the first information comprises indication information of a first resource set, the first resource set is a part of the second resource set, and the first resource set is for receiving data; and receive the feedback information for the first data from the first device on the frequency domain resource corresponding to the identifier of the first device.

10. The apparatus according to claim 9, wherein a correspondence between the frequency domain resource and the identifier of the first device is preconfigured.

11. The apparatus according to claim 10, wherein the sidelink control information further comprises trigger information, and the trigger information indicates whether the first device needs to send the feedback information for the first data.

12. The apparatus according to claim 10, wherein the feedback information for the first data is a hybrid automatic repeat request (HARQ).

13. An apparatus, comprising:
a memory storage comprising instructions; and
one or more processors in communication with the memory storage, wherein execution of the instructions by the one or more processors causes the apparatus to:
receive configuration information from a network device, wherein the configuration information comprises an indication field, the indication field is not 0, and the indication field not being 0 indicates that the apparatus will send feedback information;

receive sidelink control information from a second device, wherein the sidelink control information comprises indication information of a second resource set;

send first information to the second device, wherein the first information comprises indication information of a first resource set, the first resource set is a part of the second resource set, and the first resource set is for receiving data;

receive first data on a resource of the second resource set from the second device; and send feedback information for the first data to the second device, wherein a frequency domain resource used to send the feedback information for the first data corresponds to an identifier of the apparatus.

14. The apparatus according to claim 13, wherein a correspondence between the frequency domain resource used to send the feedback information for the first data and the identifier of the apparatus is preconfigured.

15. The apparatus according to claim 13, wherein the sidelink control information further comprises trigger information, and the trigger information indicates whether the apparatus sends the feedback information for the first data.

16. The apparatus according to claim 13, wherein the feedback information for the first data is hybrid automatic repeat request (HARQ) information.

* * * * *